(12) United States Patent
Damberg et al.

(10) Patent No.: US 12,160,690 B2
(45) Date of Patent: Dec. 3, 2024

(54) LIGHT FIELD PROJECTORS AND METHODS FOR REDISTRIBUTING LIGHT DYNAMICALLY TO ACHIEVE A LIGHT FIELD

(71) Applicant: MTT INNOVATION INCORPORATED, Vancouver (CA)

(72) Inventors: Gerwin Damberg, Vancouver (CA); Anders Ballestad, Vancouver (CA)

(73) Assignee: MTT INNOVATION INCORPORATED, Vancouver (CA)

( * ) Notice: Subject to any disclaimer, the term of this patent is extended or adjusted under 35 U.S.C. 154(b) by 0 days.

(21) Appl. No.: 16/107,442

(22) Filed: Aug. 21, 2018

(65) Prior Publication Data

US 2018/0376115 A1 Dec. 27, 2018

Related U.S. Application Data

(63) Continuation of application No. 15/030,799, filed as application No. PCT/CA2014/051013 on Oct. 20, 2014, now Pat. No. 10,477,170.
(Continued)

(51) Int. Cl.
*H04N 9/31* (2006.01)
*G02B 26/08* (2006.01)
(Continued)

(52) U.S. Cl.
CPC ....... *H04N 9/3152* (2013.01); *G02B 26/0808* (2013.01); *G02B 26/0816* (2013.01);
(Continued)

(58) Field of Classification Search
CPC ............ G02B 26/0808; G02B 26/0816; G02B 26/0833; G02B 26/0875; G02B 26/101;
(Continued)

(56) References Cited

U.S. PATENT DOCUMENTS

| | | | |
|---|---|---|---|
| 5,287,096 A | 2/1994 | Thompson et al. | |
| 5,490,009 A | 2/1996 | Venkateswar et al. | |

(Continued)

FOREIGN PATENT DOCUMENTS

| | | |
|---|---|---|
| CA | 2088497 A1 | 2/1992 |
| CA | 2443494 A1 | 3/2005 |

(Continued)

OTHER PUBLICATIONS

European Patent Office, Communication pursuant to Article 94(3) EPC, EP Patent Application 14854627.8, Dec. 6, 2019, 5 pages.
(Continued)

*Primary Examiner* — Ke Xiao
*Assistant Examiner* — Nelson Lam
(74) *Attorney, Agent, or Firm* — HSML P. C.

(57) ABSTRACT

Undesirably high energy-consumption in illuminating devices can be caused at least in part by wasted (attenuated) light. Optically efficient illumination systems that may be used to project light, including images, use light redirection. Phase modulating devices may be applied to create desired light fields. Some embodiments provide dual or multiple modulation display or projection systems in which some or all of the modulators not only attenuate amplitude, but also amplify amplitude, or change the phase, frequency and polarization of the light provided by the light source.

15 Claims, 20 Drawing Sheets

Related U.S. Application Data

(60) Provisional application No. 61/893,270, filed on Oct. 20, 2013.

(51) Int. Cl.

| | | |
|---|---|---|
| *G02B 26/10* | (2006.01) | |
| *G02B 27/00* | (2006.01) | |
| *G02B 27/09* | (2006.01) | |
| *G03H 1/22* | (2006.01) | |
| G02B 27/30 | (2006.01) | |
| G02F 1/133 | (2006.01) | |
| G09G 3/00 | (2006.01) | |

(52) U.S. Cl.
CPC ....... *G02B 26/0875* (2013.01); *G02B 26/101* (2013.01); *G02B 27/0012* (2013.01); *G02B 27/0905* (2013.01); *G02B 27/0927* (2013.01); *G03H 1/2294* (2013.01); *H04N 9/3111* (2013.01); *H04N 9/312* (2013.01); *H04N 9/3129* (2013.01); *H04N 9/3132* (2013.01); *H04N 9/315* (2013.01); *H04N 9/3161* (2013.01); G02B 26/0825 (2013.01); G02B 27/30 (2013.01); G02F 1/13306 (2013.01); G02F 2203/12 (2013.01); G02F 2203/50 (2013.01); G03H 2225/32 (2013.01); G09G 3/002 (2013.01)

(58) Field of Classification Search
CPC ............ G02B 26/105; G02F 2203/12; G03H 1/2294; H04N 9/31; H04N 9/3102; H04N 9/3105; H04N 9/3108; H04N 9/312; H04N 9/3126; H04N 9/3129; H04N 9/3132; H04N 9/3152; H04N 9/3161; H04N 9/3164
USPC .................. 345/87–104, 600–602, 690–697
See application file for complete search history.

(56) References Cited

U.S. PATENT DOCUMENTS

| | | | | |
|---|---|---|---|---|
| 5,597,223 | A | * | 1/1997 | Watanabe .......... G02B 26/0833 353/101 |
| 5,886,675 | A | | 3/1999 | Aye |
| 5,953,469 | A | | 9/1999 | Zhou |
| 5,956,000 | A | | 9/1999 | Kreitman et al. |
| 5,978,142 | A | | 11/1999 | Blackham et al. |
| 6,057,537 | A | | 5/2000 | Schubert et al. |
| 6,115,022 | A | | 9/2000 | Mayer et al. |
| 6,222,593 | B1 | | 4/2001 | Higurashi et al. |
| 6,406,148 | B1 | | 6/2002 | Marshall et al. |
| 6,456,339 | B1 | | 9/2002 | Surati et al. |
| 6,490,364 | B2 | | 12/2002 | Hanna et al. |
| 6,568,816 | B2 | | 5/2003 | Mayer et al. |
| 6,570,623 | B1 | | 5/2003 | Li et al. |
| 6,733,138 | B2 | | 5/2004 | Raskar et al. |
| 6,760,075 | B2 | | 7/2004 | Mayer, III et al. |
| 6,771,272 | B2 | | 8/2004 | Deering et al. |
| 6,804,406 | B1 | | 10/2004 | Chen et al. |
| 6,814,448 | B2 | | 11/2004 | Ioka |
| 7,108,379 | B2 | | 9/2006 | Tan |
| 7,118,226 | B2 | | 10/2006 | Davis et al. |
| 7,440,160 | B2 | | 10/2008 | Heckmeier et al. |
| 7,712,902 | B2 | | 5/2010 | Nakamura et al. |
| 8,330,870 | B2 | | 12/2012 | Marcus et al. |
| 8,339,695 | B2 | | 12/2012 | Haussler et al. |
| 8,534,868 | B2 | | 9/2013 | Salters et al. |
| 8,547,641 | B2 | | 10/2013 | Capolla |
| 8,687,271 | B2 | * | 4/2014 | Ninan .................. G09G 3/3611 345/55 |
| 8,749,463 | B2 | | 6/2014 | Matsumoto et al. |
| 9,874,319 | B2 | | 1/2018 | Minor et al. |
| 10,171,779 | B2 | | 1/2019 | Kozak et al. |
| 10,324,361 | B2 | | 6/2019 | Damberg et al. |
| 10,404,957 | B2 | | 9/2019 | Damberg et al. |
| 10,408,390 | B2 | | 9/2019 | Minor et al. |
| 10,477,170 | B2 | | 11/2019 | Damberg et al. |
| 10,531,055 | B2 | | 1/2020 | Richards et al. |
| 11,637,996 | B2 | * | 4/2023 | Damberg .............. G03H 1/2249 345/589 |
| 2003/0019854 | A1 | | 1/2003 | Gross et al. |
| 2003/0197669 | A1 | | 10/2003 | Marshall |
| 2003/0218590 | A1 | | 11/2003 | Kiser et al. |
| 2004/0104902 | A1 | | 6/2004 | Fujii et al. |
| 2004/0169823 | A1 | | 9/2004 | Bridgwater et al. |
| 2004/0239885 | A1 | | 12/2004 | Jaynes et al. |
| 2005/0018309 | A1 | | 1/2005 | Mcguire et al. |
| 2005/0058175 | A1 | | 3/2005 | Gross et al. |
| 2005/0111072 | A1 | * | 5/2005 | Miyagaki .............. G02B 5/3016 359/279 |
| 2005/0195223 | A1 | | 9/2005 | Nitta et al. |
| 2006/0072075 | A1 | | 4/2006 | De Vaan et al. |
| 2006/0158405 | A1 | * | 7/2006 | Willis .................. H04N 9/3123 345/84 |
| 2006/0202930 | A1 | | 9/2006 | Uchiyama et al. |
| 2006/0215130 | A1 | | 9/2006 | Nakamura et al. |
| 2007/0046898 | A1 | | 3/2007 | Conner et al. |
| 2007/0091277 | A1 | | 4/2007 | Damera-Venkata et al. |
| 2007/0103768 | A1 | | 5/2007 | Blackham |
| 2007/0268224 | A1 | | 11/2007 | Whitehead et al. |
| 2007/0273957 | A1 | | 11/2007 | Zalevsky et al. |
| 2008/0036872 | A1 | | 2/2008 | Nobori |
| 2008/0049044 | A1 | | 2/2008 | Nitta |
| 2008/0266321 | A1 | | 10/2008 | Aufranc et al. |
| 2008/0278689 | A1 | | 11/2008 | Read et al. |
| 2009/0001272 | A1 | | 1/2009 | Hajjar |
| 2009/0002297 | A1 | | 1/2009 | Sakai et al. |
| 2009/0002787 | A1 | | 1/2009 | Cable et al. |
| 2009/0040133 | A1 | | 2/2009 | Clodfelter |
| 2009/0116520 | A1 | | 5/2009 | Oozeki |
| 2009/0128875 | A1 | | 5/2009 | Christmas et al. |
| 2009/0141242 | A1 | | 6/2009 | Silverstein et al. |
| 2009/0190103 | A1 | * | 7/2009 | Takahashi ............ H04N 9/3164 353/98 |
| 2009/0225234 | A1 | | 9/2009 | Ward et al. |
| 2009/0225395 | A1 | * | 9/2009 | Ganti .................. G02B 26/001 359/291 |
| 2010/0007577 | A1 | * | 1/2010 | Ninan .................. H04N 9/3126 345/1.3 |
| 2010/0141855 | A1 | | 6/2010 | Wynn |
| 2010/0149313 | A1 | | 6/2010 | Kroll et al. |
| 2010/0208327 | A1 | * | 8/2010 | Sandstrom ............. H04N 1/195 359/290 |
| 2011/0018911 | A1 | | 1/2011 | Kitaoka et al. |
| 2011/0019112 | A1 | | 1/2011 | Dolgoff |
| 2011/0037953 | A1 | | 2/2011 | Nizani et al. |
| 2011/0101253 | A1 | | 5/2011 | Lal et al. |
| 2011/0122467 | A1 | | 5/2011 | Futterer et al. |
| 2012/0001834 | A1 | | 1/2012 | Hudman et al. |
| 2012/0032999 | A1 | * | 2/2012 | Seetzen ............... G09G 3/3426 313/504 |
| 2012/0200476 | A1 | | 8/2012 | Kanamori et al. |
| 2012/0229430 | A1 | | 9/2012 | Ward et al. |
| 2013/0015367 | A1 | | 1/2013 | Cui |
| 2013/0038838 | A1 | | 2/2013 | Ferri |
| 2013/0070320 | A1 | | 3/2013 | Holmes |
| 2013/0077308 | A1 | | 3/2013 | Svensen et al. |
| 2013/0162952 | A1 | | 6/2013 | Lippey et al. |
| 2013/0170007 | A1 | | 7/2013 | Kurashige et al. |
| 2013/0182322 | A1 | | 7/2013 | Silverstein |
| 2013/0201403 | A1 | | 8/2013 | Iversen |
| 2013/0214688 | A1 | | 8/2013 | Chapman et al. |
| 2013/0215012 | A1 | | 8/2013 | Reddy et al. |
| 2013/0250049 | A1 | | 9/2013 | Schwerdtner |
| 2013/0265622 | A1 | | 10/2013 | Christmas et al. |
| 2014/0002514 | A1 | | 1/2014 | Richards |
| 2014/0029858 | A1 | * | 1/2014 | Tung .................. G09G 3/3466 382/218 |
| 2014/0043352 | A1 | | 2/2014 | Damberg et al. |
| 2014/0055692 | A1 | | 2/2014 | Kroll et al. |
| 2014/0268330 | A1 | | 9/2014 | Perkins |

(56) References Cited

U.S. PATENT DOCUMENTS

| | | | |
|---|---|---|---|
| 2015/0042895 A1 | 2/2015 | Jannard et al. | |
| 2015/0172610 A1 | 6/2015 | Candry et al. | |
| 2016/0086555 A1* | 3/2016 | Ward | H04N 13/398 |
| | | | 345/204 |
| 2016/0093252 A1* | 3/2016 | Harada | G09G 3/3426 |
| | | | 345/694 |
| 2016/0284260 A1 | 9/2016 | Mizuno | |
| 2016/0381329 A1 | 12/2016 | Damberg et al. | |
| 2017/0078629 A1 | 3/2017 | Kozak et al. | |
| 2017/0085846 A1 | 3/2017 | Damberg et al. | |
| 2017/0127025 A1 | 5/2017 | Damberg et al. | |
| 2017/0150107 A1 | 5/2017 | Kozak et al. | |
| 2017/0192224 A1* | 7/2017 | Logiudice | F21S 41/153 |
| 2018/0373129 A1 | 12/2018 | Pertierra et al. | |
| 2019/0124304 A1 | 4/2019 | Kozak et al. | |
| 2020/0004115 A1* | 1/2020 | Kyosuna | H04N 9/3182 |

FOREIGN PATENT DOCUMENTS

| | | |
|---|---|---|
| CA | 2884903 C | 9/2015 |
| CA | 2956844 A1 | 2/2016 |
| CN | 102053371 A | 5/2011 |
| CN | 1643565 B | 9/2013 |
| CN | 103325129 A | 9/2013 |
| CN | 103477640 A | 12/2013 |
| CN | 106662753 A | 5/2017 |
| DE | 102005021155.0 B3 | 11/2006 |
| DE | 102005021155 B3 | 11/2006 |
| DE | 102009028626.8 A1 | 1/2011 |
| DE | 102009028626 A1 | 1/2011 |
| EP | 1098536 A2 | 5/2001 |
| EP | 1363460 A2 | 11/2003 |
| EP | 0927379 A4 | 12/2005 |
| EP | 0927379 B1 | 8/2008 |
| EP | 3180652 A4 | 4/2018 |
| GB | 2398130 A | 8/2004 |
| GB | 2482066 A | 1/2012 |
| GB | 2485609 A | 5/2012 |
| GB | 2499579 A | 8/2013 |
| JP | H06242509 A | 9/1994 |
| JP | H095881 A | 1/1997 |
| JP | H11-337871 A | 12/1999 |
| JP | 2007-033576 A | 2/2007 |
| JP | 2007-033577 A | 2/2007 |
| JP | 2007532983 A | 11/2007 |
| JP | 2008015064 A | 1/2008 |
| JP | 2008-089686 A | 4/2008 |
| JP | 2008197386 A | 8/2008 |
| JP | 5287121 B2 | 10/2008 |
| JP | 2009-042372 A | 2/2009 |
| JP | 2009180821 A | 8/2009 |
| JP | 2010529484 A | 8/2010 |
| JP | 2010-533889 A | 10/2010 |
| JP | 2011-502274 A | 1/2011 |
| JP | 2011514546 A | 5/2011 |
| JP | 2012237814 A | 12/2012 |
| JP | 2013015599 A | 1/2013 |
| JP | 2014513316 A | 5/2014 |
| JP | 2014517337 A | 7/2014 |
| JP | 2014518400 A | 7/2014 |
| JP | 2015510150 A | 4/2015 |
| JP | 2017527111 A | 9/2017 |
| WO | 0125848 A2 | 4/2001 |
| WO | 2004046805 A1 | 6/2004 |
| WO | 2006116536 A1 | 11/2006 |
| WO | 2008013368 A1 | 1/2008 |
| WO | 2008049917 A1 | 5/2008 |
| WO | 2008075096 A1 | 6/2008 |
| WO | 2009089211 A1 | 7/2009 |
| WO | 2009126263 A1 | 10/2009 |
| WO | 2010125367 A1 | 11/2010 |
| WO | 2010149587 A2 | 12/2010 |
| WO | 2011061914 A1 | 5/2011 |
| WO | 2011071701 A1 | 6/2011 |
| WO | 2012021567 A2 | 2/2012 |
| WO | 2012125756 A1 | 9/2012 |
| WO | 2012145200 A1 | 10/2012 |
| WO | 2012151262 A2 | 11/2012 |
| WO | 2012166536 A1 | 12/2012 |
| WO | 2012166682 A2 | 12/2012 |
| WO | 2013029667 A1 | 3/2013 |
| WO | 2013117903 A1 | 8/2013 |
| WO | 2013117923 A1 | 8/2013 |
| WO | 2013130037 A1 | 9/2013 |
| WO | 2015054797 A1 | 4/2015 |
| WO | 2015172236 A1 | 11/2015 |
| WO | 2015184549 A1 | 12/2015 |
| WO | 2016015163 A1 | 2/2016 |
| WO | 2016023133 A1 | 2/2016 |

OTHER PUBLICATIONS

European Patent Office, Examination Report for European Application No. 14854627.8; Date of Mailing: Dec. 13, 2018., 5 pages.
Hoskinson et al. "Light Reallocation for High Contrast Projection Using an Analog Micromirror Array," ACM Siggraph conference proceedings, Dec. 15, 2010, 10 pages.
International Search Report and Written Opinion, PCT Patent Application PCT/CA2014/051013, mailed Jan. 30, 2015, 11 pages.
International Search Report and Written Opinion, PCT Patent Application PCT/CA2015/050778, dated Nov. 24, 2015, 10 pages.
Office Action for Japanese Application No. 2016-525963; Date of Mailing: Nov. 9, 2018; 10 pages.
Schwartzburg, Y. et al. "High-Contrast Computational Caustic Design," ACM Transactions on Graphics, ACM, US vol. 33, No. 4, Jul. 27, 2014, 11 pages.
European Patent Office, Communication pursuant to Article 94(3) EPC, EP Patent Application 15827729.3, mailed Dec. 17, 2019, 8 pages.
European Patent Office, Extended European Search Report, EP Patent Application 15827729.3, mailed Feb. 20, 2018, 13 pages.
Hoskinson et al., "Light Reallocation for High Contrast Projection Using an Analog Micromirror Array", ACM SIGGRAPH conference proceedings, 2010.
European Patent Office, Communication pursuant to Article 94(3) EPC, EP Patent Application 15792616.3, mailed Feb. 2, 2021, 9 pages.
European Patent Office, Extended European Search Report, EP Patent Application 15792616.3, mailed Dec. 7, 2017, 11 pages.
European Patent Office, Communication pursuant to Article 94(3), EP Patent Application 16852940.2, mailed Mar. 26, 2021, 6 pages.
European Patent Office, Extended European Search Report, EP Patent Application 16852940.2, mailed May 9, 2019, 8 pages.
Murdoch, Michael J. et al. "Veiling Glare and Perceived Black in High Dynamic Range Displays," Journal of the Optical Society of America, vol. 29, No. 4, p. 559, Apr. 1, 2012, 17 pages.
European Patent Office, Extended European Search Report, EP Patent Application 21214505.6, mailed May 9, 2022, 9 pages.
Office Action issued in Japanese Application No. 2022-142349, dated Jul. 2, 2024, with machine translation.
Communication issued in European Application No. 21214505.6, dated May 23, 2024.

* cited by examiner

LIGHT FIELD PROJECTORS AND METHODS FOR REDISTRIBUTING LIGHT DYNAMICALLY TO ACHIEVE A LIGHT FIELD

CROSS-REFERENCE TO RELATED APPLICATIONS

This application is a continuation of U.S. application Ser. No. 15/030,799, which is a 371 of PCT Application No. PCT/CA2014/051013 filed 20 Oct. 2014. PCT/CA2014/051013 claims priority from U.S. application Ser. No. 61/893270 filed 20 Oct. 2013. For purposes of the United States, this application claims the benefit under 35 U.S.C. § 119 of U.S. application Ser. No. 61/893270 filed 20 Oct. 2013 and entitled LIGHT FIELD PROJECTORS AND METHODS, which is hereby incorporated herein by reference for all purposes.

TECHNICAL FIELD

This invention relates to light projectors. Some embodiments may be applied to project images for viewing. Other embodiments may be applied to create structured light for illumination or other purposes. Embodiments have example application in markets such as digital cinema, TV and home theater, portable and personal projection (military, mobile, etc.), indoor and outdoor personal and large screen advertising and information dissemination, signs/advertising/billboards/outdoor advertising, large-venue and live performance, medical imaging, virtual reality, computer gaming, office presentations and collaborative work, head-up displays in cars and other vehicles, smart illumination such as adaptive car head-lights, theatre spotlights, security/architectural lighting, high contrast planetarium projectors, indoor and outdoor general illumination systems, street-lighting, road-lighting, aviation lighting systems, and high-contrast simulation displays such as flight simulators

BACKGROUND

There are many situations where it is desired to create a light field that has a specified luminance profile. Light projection systems have a very wide range of applications from architectural lighting to the display of lifelike images. The projected light patterns can be dynamic (e.g. video), static (used for static images or static applications like the beams of typical car headlights projected through a lens onto the road, made by arbitrarily shaped optical surfaces, etc.). Light may be projected onto a wide range of screens and other surfaces which may be flat or curved. Such surfaces may be fully reflective (like a canvas used in a cinema, a wall or a building) or partially reflective (such as the windshield of a vehicle). Screens may be low-gain or high-gain, Lambertian or highly directional, high-contrast or lower in contrast. Light may be projected onto solid objects or onto a medium in a volume (such as fog).

Markets for and applications of light projectors include digital cinema, in-door and out-door advertising, medical imaging (both for display of images, as well as capture by a smart light source), large venue and live events or performances, automotive heads up displays, car head-lights and rear-lights, automotive entertainment and information displays, home-theatre, portable business projection, television and displays for consumer applications, military applications, aviation applications (like cockpit displays, smart landing-assistance, individual passenger entertainment displays), structured light sources for industrial applications, automotive headlights and other applications.

Various devices may be used to spatially modulate light. These may be called spatial light modulators (SLMs). Most SLMs provide a 2D array of independently and individually addressable pixels. Some examples of SLMs are reflective SLMs such as digital micro-mirror devices (DMDs), liquid crystal on silicon (LCoS) devices and transmissive SLMs such as LCD panels, transmissive LCD chips such as high-temperature polysilicon (HTPS) or low-temperature polysilicon (LTPS); and partially reflective/partially transmissive SLMs such as micro-electro-mechanical systems (MEMS) based systems in which some of incident light is transmitted and some of incident light is reflected. One problem is that most readily available spatial light modulation technologies are subtractive. These SLM technologies operate by absorbing or removing undesired light. This contributes to the more general problem that light projection and often general illumination technologies tend to have undesirably high energy consumption and may also have an undesirably limited peak luminance.

Additional considerations apply to light projectors that are applied to project images. For example, in such projectors raised black-levels, undesirably low contrast and limited colour-saturation can be concerns.

These limitations can mean that a dark viewing environment such as a cinema, a dark living room, or some other lighting-controlled environment, is needed to get the best out of projected imagery. This limits the possible applications for projectors.

In all fields of technology including light projection achieving a desired level of performance at a competitive cost can be an issue.

There is a general need for light projection systems that ameliorate one or more of the above-noted problems.

SUMMARY

This invention relates to systems that re-distribute light dynamically from a single or multiple light sources in order to achieve a desired light field (which may or may not comprise an image depending on the application) efficiently. Re-distribution of light involves taking light from one area within a light field and directing the light to another area within the light field. Some embodiments provide a controllable illumination system that can be used as a component in any of a wide range of lighting applications. Other aspects of the invention provide methods for creating light fields and light projectors which apply such methods.

A light field projection system according to some embodiments comprises a data processor, a computer software program, one or more light sources and a light control mechanism that includes one or more dynamically-addressable optical elements. The light control mechanism may also include one or more static optical elements such as lenses, mirrors, gaps, optical fibers, light guides and the like in an optical path. The software program, when executed by the processor may process data specifying one or more desired target light fields (which may, for example, comprise anything from desired headlight patterns to image frames in a movie) and may cause the one or more dynamically-addressable optical elements to redirect light to achieve the desired light fields.

Example embodiments of the invention provide light projectors, projection displays, methods for operating projection displays, media containing computer readable constructions which, when executed by a data processor, cause the data processor to execute a method according to the invention, methods for displaying images, methods for processing image data for display, methods for processing sequences of image data for display, among others.

Further aspects of the invention and features of an illustrative set of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
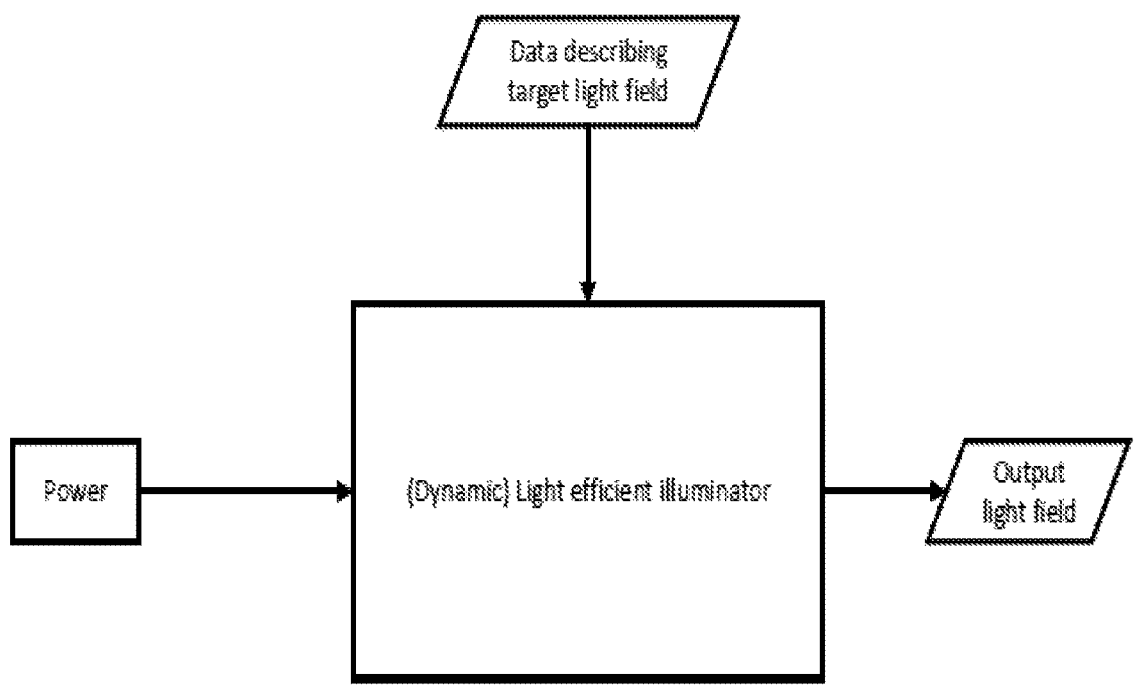
FIG. 1 is a block diagram of an example system (light efficient illuminator) at a high level.

FIG. 1 illustrates schematically an example system for generating a light field according to an example embodiment. The system is configured to receive data describing a target light field and to produce an output light field that closely matches the desired target light field by redirecting light. In some cases the output light field may require further optical or other treatment to produce the desired target output light field. Such treatment may be provided by one or more refinement stages as described herein. As described in more detail below, the system does this in an optically efficient manner, in which little light is wasted. The system includes one or more light generators (light sources) that can be operated to create light. In some embodiments the system operates the light generators to output light and then redirects the light to provide the output light field. The output of the light generators may be controlled to match the amount of output light to the amount of light required for the output light field. Most of the light generated by the light generator(s) may end up in the output light field.

Figure 2:
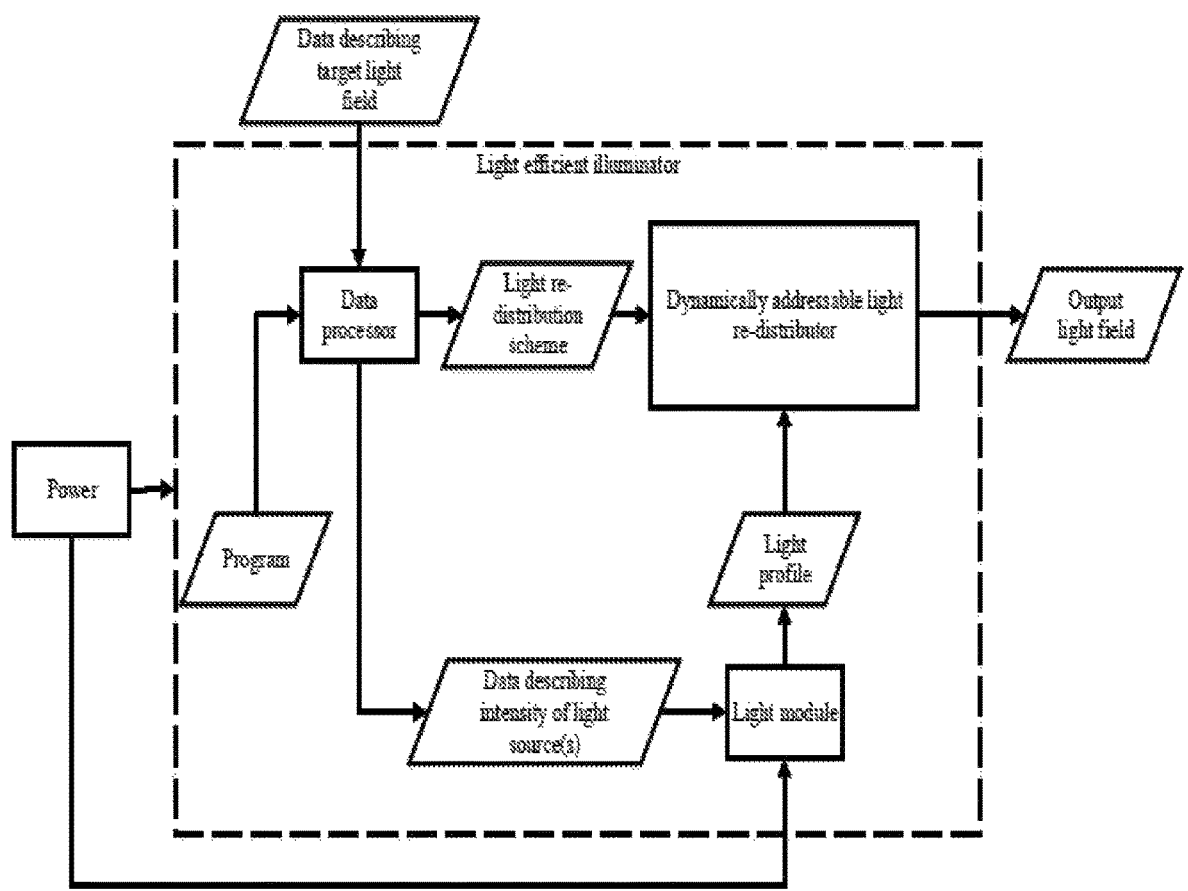
FIG. 2 is a block diagram of the system of FIG. 1 at a more detailed level showing basic components of a light efficient illuminator.

FIG. 2 depicts an example dynamic light-efficient illuminator in more detail. A program is executed on a data processor. The program receives data describing the target light field and computes a light redistribution scheme to be applied by a dynamically-addressable light re-distributor. The program also computes data describing the intensities for one or more light sources that generate light supplied to the light redistributor.

A data processor is not required in all embodiments. In some embodiments light redistribution schemes for a pre-determined set of light fields are determined in advance. In such embodiments data defining the light redistribution schemes corresponding to the light fields may be stored, embodied in fixed or configurable logic circuits or the like. Appropriate data can then be applied to control the light redistributor to generate a desired one of the light fields without the necessity for any computation.

The light module (comprising the light sources and light redistributor and associated optics) receives power, as well as data describing the intensities of one or several light sources and generates a light field having a desired light profile. An example light module is further illustrated in FIG. 3.

Figure 3:
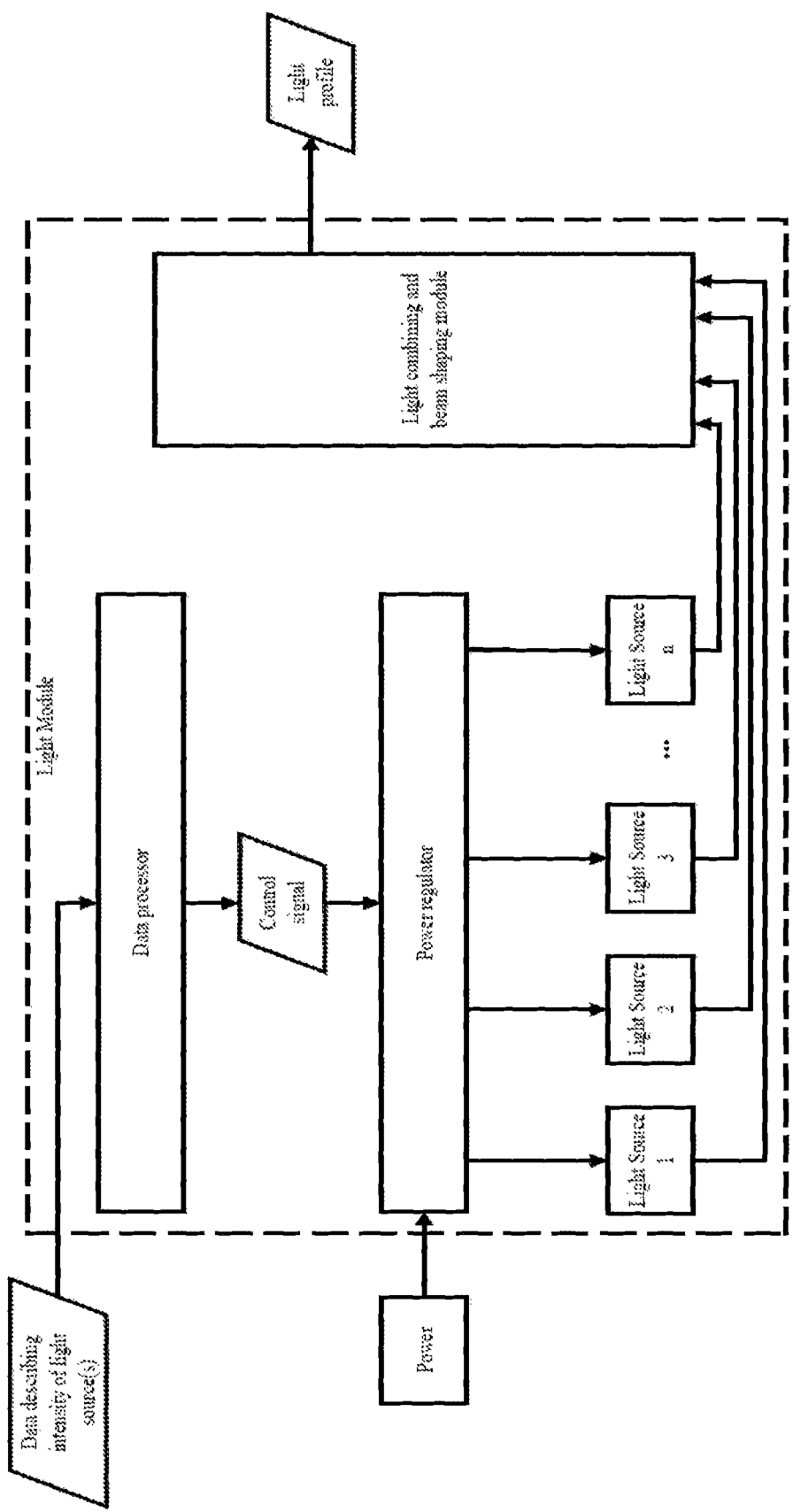
FIG. 3 is a block diagram detailing the components within the light module which is a component of the light efficient illuminator shown in FIG. 2.

FIG. 3 is a more detailed schematic view of an example light module. The light module comprises a data processor, a power regulator, one or many light sources, and a light combining and beam-shaping module.

The data processor receives data describing the intensity for the light source(s) and produces a control signal for the power regulator that in turn controls the amount and/or timing of power distributed to each light source. The power regulator may include a plurality of separate outputs and/or may include a plurality of independent power regulation circuits.

The light sources may be of any of a wide variety of types. One light module may optionally include light sources of a plurality of types. Some examples of light sources are: lasers, arc-lamps, LEDs, high-intensity lamps, etc.

Each light source may emit light of different shapes, intensities and profiles. An example light profile produced by a light source could be a uniform, rectangular intensity profile which could be produced using integrating rods or other optics. Another example of a light profile has a Gaussian or sum of Gaussians intensity profile. Another example is an array of rectangular uniform profiles (blocks) with different intensities. In another example, the light profile produced by the light module can take any desired shape.

The light from the light source(s) is then coupled to the input of the light redistributor. The coupling may involve spatially combining light from a plurality of light sources and/or shaping the light optically to yield light having the desired light profile for input to the dynamically-addressable light redistributor. The light combination and beam shaping may be done using common optical elements such as beam-splitters, polarizers, wave plates, multi-layer thin films, beam-combiners, micro-lens arrays, lenses, apertures and/or mirrors. These elements can be optimized for the nature of the light emitted by the light sources (e.g. narrow-band or broad-band light sources).

In one preferred embodiment, light from a plurality of light sources is coupled into a common optical fibre and at the output of the fiber the light is collimated using a set of lenses.

Data present within the system, for example the control signal or data describing the light profile incident on the Dynamically-addressable Light Re-Distributor may be provided to external components or systems, for example in the form of metadata.

Figure 4:
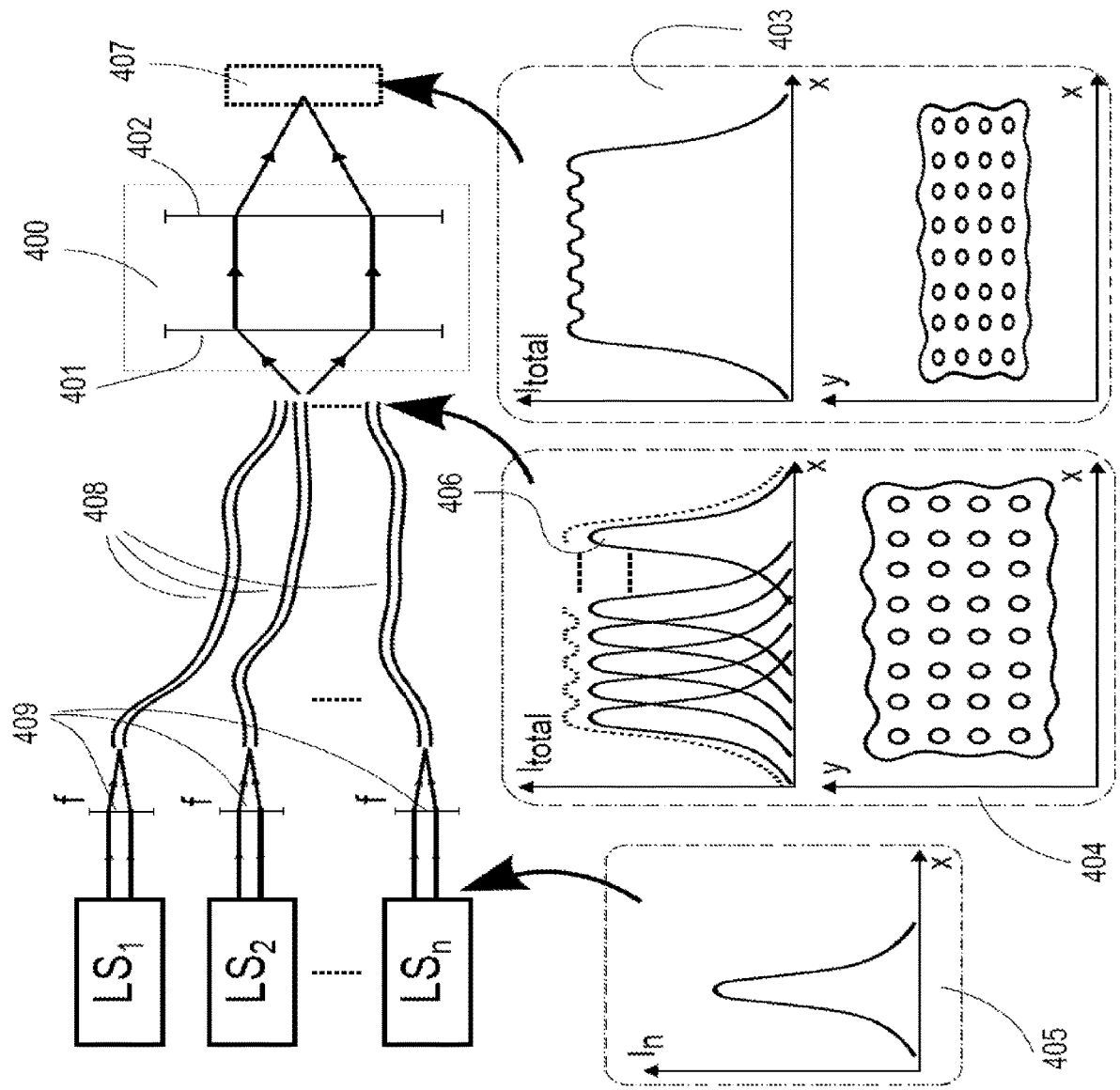
FIG. 4 details example optical components within the light module of FIG. 3 and also depicts example light profiles at each stage within the light module.

FIG. 4 shows example light profiles at various stages through the system illustrated in FIG. 3.

The light redistributor may controllably alter the nature and/or distribution of light using techniques that are not primarily subtractive. For example, the light redistributor may exploit interference of electro-magnetic waves (light), to modulate the distribution of light by controlling its phase characteristics and/or modulate the frequency of the light in order to change the apparent colour of light. Both of these examples show how light can be changed without converting energy from the light into wasted heat by absorbing the light.

In one embodiment one or more light sources LS1 to LSn are coupled into one or more optical fibres 408, for example using focusing lenses 409. 405 shows an example light profile of the $n^{th}$ light source. The combined output from the optical fibres 408 are relayed onto the dynamically-addressable light redistributor 407, for example using relay lens system 400, comprising, for example, two focusing lenses 401 and 402. The combined effect of the two lenses 401 and 402 in 400 may be to asymmetrically magnify the output profile from the optical fibres 408. 403 shows two example plots: at top the combined intensity across one spatial dimension of 407 and at bottom contours of the light profile present on 407 in two dimensions. 404 shows an example of the same type of plots of the intensity and contours present at the output of 408. Furthermore the top plot in 404 illustrates how the total intensity of the light profile may be made up from a plurality of light profiles for example 406 from each light source LS1 to LSn.

Figure 5:
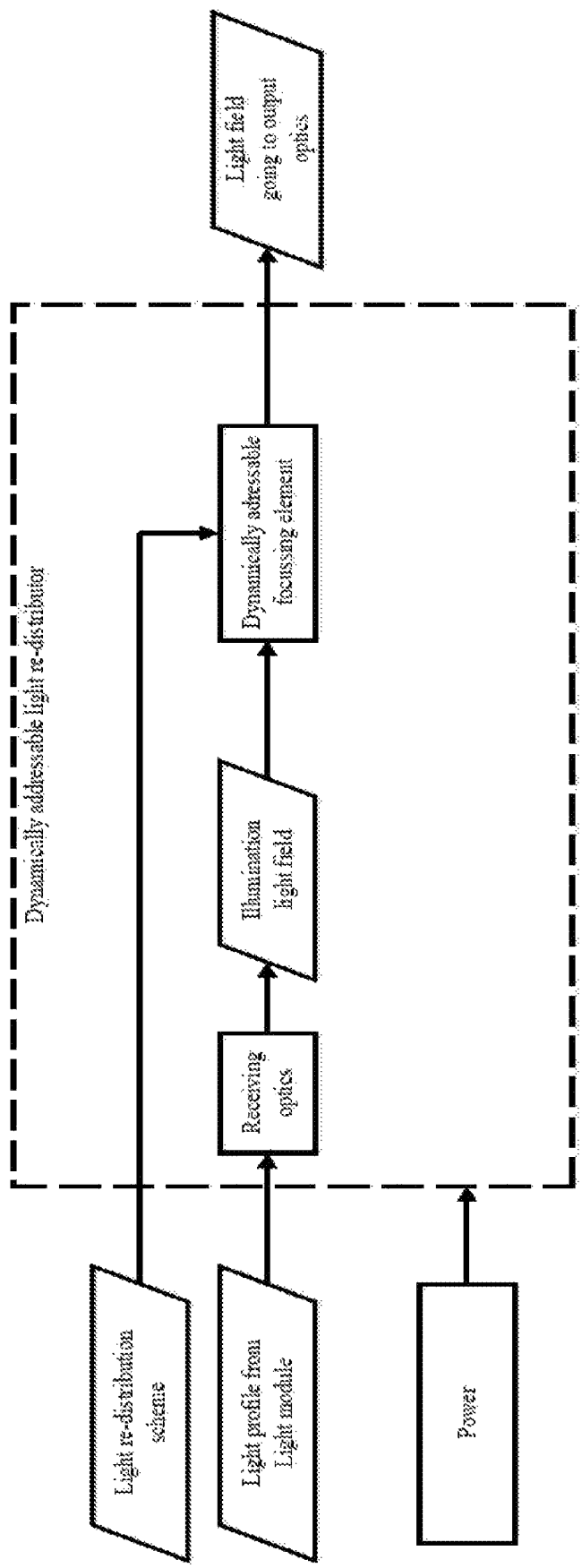
FIG. 5 is a block diagram of an example dynamically-addressable light redistribution module.

FIG. 5 schematically illustrates one type of dynamically-addressable light redistributor. The dynamically-addressable light redistributor comprises receiving optics, and a dynamically-addressable focusing element.

Examples of devices suitable for use as dynamically-addressable focusing elements in different embodiments include: transmissive 2D arrays of controllable liquid crystal compartments with the property that the compartments can be controlled to selectively retard the phase of light, effectively causing a change in path-length. The same type of device could be implemented in a reflective manner. A dynamically-addressable focusing element may also affect the polarization of light. Some devices may alter several light properties simultaneously.

In some other embodiments a dynamically-addressable focusing element comprises one or more scanning mirrors, such as a 2D or 3D microelectromechanical system (MEMS); and/or one or more deformable lenses or mirrors or other optical elements. A dynamically-addressable focusing element may also or in the alternative comprise one or more optical switches.

The receiving optics transforms an incoming light profile from the light module into an illumination light field that matches or approximately matches the size, shape and angular acceptance range of the dynamically-addressable focusing element. The receiving optics could, for example, comprise one or more of: a prism system, a lens, a free space optical path, an integrating rod or waveguide.

The dynamically-addressable focusing element is controlled by data that corresponds to a light re-distribution scheme. The data may describe a variation in light path-length across the device which, when implemented by or executed on the dynamically-addressable focusing element causes the formation of the desired output light-field.

Figure 6:
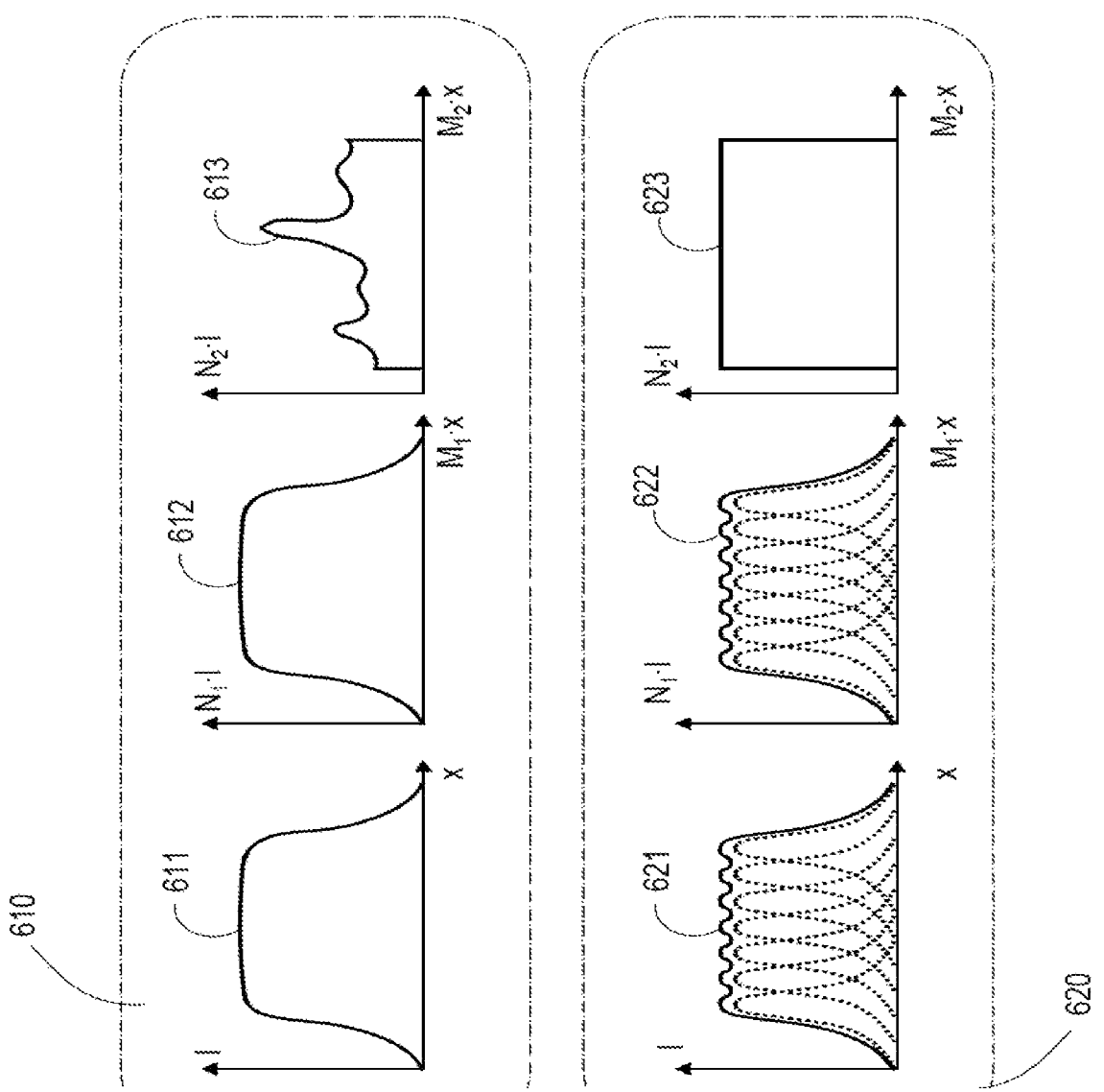
FIG. 6 shows two examples (top and bottom) of light profiles at the light module (left), at a dynamically-addressable focusing element (center) and at the system output.

FIG. 6 shows some examples of light profiles created in the light module and an example final system output light profile. FIG. 6 includes two examples of what the light fields may be at three stages of FIG. 5: an incoming light profile from the light module, the illumination light field present at the dynamically-addressable focusing element, and the light field going to the output optics. Example 1 illustrates the case where a fairly uniform input light field is transformed into an arbitrary and desired output light field. Example 2 illustrates the case where a non-uniform input light profile made up with light from an array of independent light sources is transformed into a uniform light field at the output.

FIG. 6 shows two example sets of light profiles at various stages of the Light Efficient Illuminator. In 610, an application is shown in which the light profile 611 at the output of the light module is transformed into an arbitrary light profile 613 at the output of the light efficient illuminator. The arbitrary light profile 613 may directly represent the target light field or target image. The light profile 612 shows the light profile 611 relayed and magnified onto the dynamically-addressable focusing element. M1 and M2 represent the magnification of the optical system, resulting in the intensity scale factors N1 and N2, respectively.

In 620, an application is shown in which the light profile 621 at the output of the light module is transformed into a uniform light profile 623 at the output of the light efficient illuminator. The light profile 622 shows the light profile 621 relayed and magnified onto the dynamically-addressable focusing element. M1 and M2 represent the magnification of the optical system, resulting in the intensity scale factors N1 and N2, respectively.

Providing a module capable of yielding a wide range of output light fields is advantageous as such modules may be optimized for optical efficiency and may be applied in any of a wide range of applications as described above. Apparatus according to the invention may also be integrated directly into projectors, displays, lights etc.

Explanation of How to Use a Phase Modulator to Create a Desired Light Field, Description of Basic Arrangement Example phase modulation devices include:

Spatial light modulators (SLM), for example a 1D or 2D array of pixels, in which the drive level addressed at a pixel correlates to the phase delay applied to the light impinging on that pixel, for example the drive levels between 0 and 65535 may correspond to the range of phase delay between 0 and 2π radians (one cycle of the wavelength of the light).

Such a spatial modulator can simultaneously change the state of polarization of the light (an example is a transmissive liquid-crystal display, or a reflective liquid crystal-on-Silicon display (LCoS)). Alternatively, such an SLM can be designed ONLY to affect the phase delay of that pixel, but not its polarization.

An acousto-optical modulator (AOM; also called a Bragg cell) can affect deflection angle of the incoming light, its phase, frequency and polarization characteristics.

A grating light valve (GLV); currently, these devices are 1D addressable arrays where each pixel or element can vary the phase of the impinging light by mechanically varying the path length.

How to Use a Phase Modulator to Create a Desired Light Field

A lens in the classical sense is a variable thickness piece of glass that retards the phase of the incident light differently across the lens surface, resulting in a focused or de-focused spot of light depending on the curvature or shape of the lens. A similar effect can be achieved by retarding the phase of the incoming light beam using a phase modulating device (PMD). For example, the effect of a lens can be achieved by addressing a varying phase pattern on the PMD, with for example 2π phase retardation in the centre of the PMD, falling off to 0 phase retardation on the edges of the PMD. Stronger lenses (lenses with a shorter focal distance) can be achieved by controlling the PMD to provide phase modulation in a pattern like that of a Fresnel-lens.

A PMD may be controlled to simulate the effects of other optical elements, such as prisms and gratings in a similar fashion, for example by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

Several lenses side-by-side or super-imposed on the PMD can coarsely approximate an image. By suitably controlling a PMD to emulate the action of a number of lenses one can create a situation where an image or parts of an image are in focus anywhere along the direction of light propagation, for example in several planes.

More complex images or illumination profiles can be achieved by controlling the PMD to present a phase adjustment that is continuously-varying over the area of the PMD as opposed to controlling the PMD to emulate a combination of discrete optical surfaces such as lenses and/or prisms.

Example Arrangements for Light Sources

Types of Light Sources

The light source for the system can for example be one or more lasers, arc-lamps, LEDs, or even the sun. The specific characteristics of a light-source can make it more desirable than others. For example, a laser might be preferable over a broad-band lamp due to its small beam size, limited optical spread (resulting in a very high intensity), limited etendue, its narrow spectral-band frequency distribution (and thereby pure colour), its polarization-, lifetime-, decay-, efficiency-, coherence and collimation characteristics.

Example Optics to Bring Light to/from Phase Modulation Device

Light needs to be transported to and from the phase modulating device (PMD). It may also be desirable to have one or several of its characteristics changed, like its illumination profile, its magnification and shape, its polarization or frequency. It is sometimes preferable to have the incoming light profile match the shape of the PMD. Examples of elements or devices that can be used to achieve this include but are not limited to:

Beam expanders consisting of one or several physical lenses;
Single or bundled optical fibres;
Prisms;
Cylindrical lenses;
Micro-lens arrays;
Gratings;
Diffusers;
Polarization filters;
Apertures;
Wave-plates;
Integrating rods.

Different Light Sources Illuminating Different Areas of Modulator

In the case that several light sources are used to illuminate the PMD, the light profiles from these separate sources may overlap, partially overlap, or not overlap on the PMD.

It might be desirable to achieve a uniform combined light profile on the PMD. In that case, optical elements such as integration rods, micro-lens arrays, diffusers, or other light-shaping devices may be included to uniformly illuminate the PMD.

The intensity of one or more of these light sources may be independently adjusted in order to achieve a desired combined light profile on the PMD. As an example, one might want to have the incident light profile be brighter in the centre of the PMD than on its edges.

Alternatively, the total amount of light from one or more light sources incident on a region on the PMD over a fixed period of time can be adjusted by turning the light-sources on and off (pulse-width modulation, PWM) instead of adjusting the intensity of the light sources. The on-time relative to the off-time determines the overall amount of light incident on the PMD over a period of time. The duration of the on-pulses in the time period may vary, and they may be periodic, non-periodic or random; the total on-time may be more relevant to perceived brightness or colour by an observer.

The pulsed PWM approach may require a synchronization between the incident light sources and other elements in this optical system.

Example Projection Arrangements

The most simple projection system comprises a light source, some beam-shaping optics to partially or fully illuminate the PMD, and a phase-retardation pattern on the PMD.

In another embodiment, a plurality of light sources may illuminate the PMD.

In another embodiment, the output light field from the PMD may be relayed onto a spatial light modulator (SLM) for further refinement, for example by amplitude modulation.

In another embodiment, the output light field from the PMD may be presented onto one or more integration rods, each of which integrates all the light incident on it into a uniform output. This output in turn may be relayed onto different regions of the SLM for further refinement.

In some embodiments, it may be desirable to relay the output light-field from any of these system arrangements onto a projection screen or surface.

Different Focusing Arrangements

In one common application, it is desirable that the projection system form an image on a flat, a near-flat, or at most slightly curved surface. In other applications, it may be desirable to project onto one or several non-flat surfaces or screens, for example a curved screen or a rough surface like a brick-wall, or a building. In another application, one might wish to project onto a moving object, like a person or animal, or a vehicle moving either on land, in the air, on water or submerged under water. Such an application may require the synchronized capture and detection of that moving object. It may also be desirable to project images or patterns onto different objects within a volume, or to different points in a volume. For example, in a car head-light application, one may wish to illuminate an upcoming stop-sign very brightly, but an approaching vehicle with reduced intensity.

A phase-pattern present on a PMD can be arranged in such a way as to focus at different depths or with different effective focal lengths. The corresponding light field can include images or features that are in focus at one plane or point, and other images or features that are simultaneously or time-delayed in focus at another plane or point. In some embodiments, one can arrange the phase-pattern on the PMD so that the system is focus-free, or in focus at any distance.

Focus at any of these points or planes can be achieved using a phase pattern on the PMD exclusively ("dynamic lenses"), rather than with physical lenses. It can also be achieved using a combination of dynamic lenses on the PMD and physical lenses. It can also be achieved using only physical lenses.

How to Image in Colour.

In one embodiment, colour images are formed by mixing appropriate ratios of light of three differently perceived colours, for example red, green and blue everywhere in the target image. For example, in an image described by a pixellated 2D array, each pixel may have different amounts of red, green and blue contributions. In another embodiment, light of four or more differently perceived colours may be mixed for a similar effect.

In one application, the different colours can be supplied simultaneously but in parallel, for example by shining each of the primary colours onto its own SLM or PMD, and then recombining the different colours using a colour re-combiner, for example a cube made up from dichroic mirrors (a so-called "X-cube"). In another application, the three (or more) light sources may illuminate different areas of one PMD. Because of the steering-capability of the PMD(s), these three (or more) regions may be combined downstream in the optical system by applying the appropriate phase pattern on the PMD(s). The phase-patterns for the differently coloured regions will be determined individually in order to ensure that when they are combined, they form a colour-image as close as possible to the target-image.

In another application, each frame of the video is broken down into its separate colour channels, for example red, green and blue. The differently coloured light sources may illuminate one image-forming device (such as the PMD, or a conventional amplitude-modulating SLM) in sequence (so-called time-multiplexing). It is desirable for these sequential colour fields to be presented in fast succession, so that the human visual system perceives the resulting colour image without colour break-up or flicker. An example is to show a red colour field for the first image of a video sequence for 1/72th of a second, followed by the green colour field for the first image for the next 1/72th of a second, followed by the blue colour field for the first image for the third 1/72th of a second for an effective frame-rate of 24 Hz or 24 frames per second. This process is then repeated for the ensuing frames of the video or image sequence.

In one embodiment, time-multiplexing may be combined with beam-steering in the following manner. In the case of a three-primary imaging system (for example R, G, and B), each of the three colours may be time-multiplexed by different amounts, providing a different amount of integrated intensity of R, G, and B onto the display screen. For example, within one complete frame-duration, the on-time of the red colour field may be a much larger fraction of the total frame-duration than the green colour field on-time. This can be extended to a higher number of primary colour light sources.

In another embodiment, the different colours may be provided simultaneously off one imaging device per colour channel. Dimming of each colour channel independently may be achieved by multiplexing each colour channel.

In another application, broadband light or several combined narrowband light sources may be split apart using a diffraction grating or a prism (for static deflection), or a PMD (for dynamic deflection). The chromatically split light may be relayed onto a (second) PMD where several bands of colour may be processed independently in order to form a final colour image at the display screen.

In one or all of the above-mentioned applications, one might use integration rods to make the intensity profile of different regions more uniform before further processing.

Control Modalities

Examples of Control System Hardware

The control system hardware may comprise a data processor and computer readable data representing the sequence of light fields ("target images"). In some embodiments, it may be preferable to process the data in real-time, and in other embodiments the data may be pre-processed and stored on computer-readable media. In some applications, the data processing may be executed on a field-programmable gate-array (FPGA), an application-specific integrated circuit, or a general purpose possibly CPU-optimized or possibly GPU-optimized computer.

A PMD may be controlled to create any of an exceedingly broad range of output light fields. Determining what data to use to drive the PMD to yield a specific desired output light field may be done in a number of ways. In a more-computationally expensive but more exact mode one can apply a mathematical model of the inverse transformation provided by the entire optical system (including the PMD) to start with the desired output light field and calculate the PMD pixel settings corresponding to the desired output light field. A less-computationally intensive but less exact mode includes setting parameters for one or more optical elements (lenses, prisms, etc) that can be emulated by the PMD to yield an output light pattern that approximates the target light pattern. The parameters may, for example, include sizes, locations and optical strength.

In one embodiment, the applied phase pattern on the PMD is determined so that given the particular optical layout of this imaging system and a matching model of this system, the light applied to it will result in an image on the display screen that very closely matches the desired light-field (the "target-image") provided by the content-device (for example from a TV network, a DVD, a Blu-Ray disk, or from a streaming internet source). Such a phase-pattern can be achieved by an iterative optimization approach, where the difference between the current solution and the target-image is iteratively minimized until a completion criterion is satisfied.

In another embodiment, the applied phase pattern on the PMD is determined so that the resulting light-field output from the PMD only partially matches the target-image or target light-field. As an example, an approximation of the target-image may be formed by summing up a number of similar or dissimilar features each described by a set of feature parameters. The features can for example be a set of Gaussian intensity profiles placed at different positions, with different amplitudes and different full-width half-maxima. This may result in a low-pass filtered or blurred version of the target-image, but may also be executed at reduced computational cost. In this embodiment, a "refinement-stage" may be required, and the output light-field of this system may be relayed onto for example a secondary amplitude modulating spatial light modulator or another PMD. The purpose of the refinement stage in this situation would be to restore the finer details of the target image or light-field.

In another embodiment, one could simulate basic physical-optics devices such as lenses and prisms on the PMD in order to scale and translate regions or parts of an image. Scaling of a particular input light intensity profile may be obtained by simulating a lens on the PMD. This lens may have a circular or a two-dimensional cylindrical symmetry. Translating a particular input light intensity profile may be achieved by simulating a prism on the PMD, for example by gradually varying the phase delay across the PMD. A lens may be described simply by its curvature, and a prism may be described by its tilt relative to the optical axis. The result of applying a uniform light distribution onto a lens is to focus, or de-focus it. If the display screen is not positioned exactly at the focal distance of said lens, a round shape of uniform light is created if the lens has circular symmetry, and a rectangle is created if the lens has a cylindrical shape.

In some embodiments, one might wish to simultaneously scale and translate a region of the image. This can be achieved by superimposing the simulated patterns for a lens and a prism.

Should the desired lens or prism require an amount of phase retardation that the PMD is unable to provide, then one could utilize a Fresnel approach where an integer multiple of $2\pi$ is subtracted from the desired value. For example, a phase retardation of "$\pi$" can have the same effect on the light-steering capabilities of a PMD as can a phase retardation value of $5\pi$. The equivalent mathematical function may be the modulus; in this example modulus($5\pi$, $2\pi$)=$\pi$.

Ways to Determine Areas

In one embodiment, the light redistribution scheme describes a method to determine how one or more regions of light entering a light redistributor could be mapped to other regions in the light exiting the light redistributor. As an example, the scheme may describe how the light incident on a 10×10 pixel region could be redirected to a 30×5 pixel region, possibly translated to another part of the image. In this particular example, the incident light used to be illuminating only 100 pixels (10×10), but after the mapping illuminates 150 pixels (30×5). Since the illuminated area in this example has been increased by 50%, the resulting intensity has been reduced by one-third. The light redistribution scheme may analyze the target-image in order to arrive at how a particular region is to be mapped.

In another embodiment, a number of equally sized regions gets mapped to the same number of regions, but these regions may all be of different sizes. Such an approach can be utilized to create a low-resolution version of the target image or light-field. The high-resolution parts of the image will now have to be restored in a downstream modulation or "refinement" stage, for example by an amplitude modulating SLM.

In some embodiments, the amount of scaling and shifting that gets applied to the equally sized regions of the image correlates in a direct or indirect way to the total intensity of light required by the target image or light-field in that region.

In other embodiments, the target image is analyzed and a number of differently sized regions are mapped to the same number of equally sized regions. The output of this approach may be incident on an array of integration rods matching the size and shape of each region.

In another embodiment, differently sized areas may be mapped to another set of differently sized areas.

In another embodiment, one number of regions may be mapped to a different number of regions.

In some embodiments, it may be desirable to ensure that neighbouring regions on the input side are still neighbours on the output side, so as to avoid gaps of illumination between two or more regions and therefore incorrectly reduce or increase the luminance or brightness in that gap between the two regions. As an example, if the light distribution scheme dictates that one region be translated away from its neighbouring region, then it should also dictate that the neighbouring region be translated along with it, either by pure translation, or by scaling, or by a combination of the two.

In an example embodiment, light incident on each of a plurality of areas on a PMD is scaled and/or translated by causing the area of the PMD to emulate a lens, a prism, or a combination thereof. The output light field is made up of the scaled/translated light.

Some embodiments may include optical switches that may be operated to selectively direct light from one area of the image or light-field to a different area or a number of different areas of the image or light-field. Such optical switches may augment a PMD or replace a PMD in some embodiments. For example, optical switches may be applied to selectively direct light from a light source into one of a plurality of integrating rods or optical fibers. The intensity of light being carried in the integrating rods or optical fibers may be adjusted by setting optical switches to change which integrating rods or optical fibers carry light from which light sources.

Another embodiment uses one or more scanning lasers to provide a desired light field. For example, a laser beam can be scanned rapidly across an area, leaving the viewer with the impression that the whole area is illuminated with equal intensity. If the laser beam is a spot, a 2-or-more axis scan may be performed. If the laser beam has the shape of a line, a 1-or more axis scan may be performed. The beam may be widened by using for example a motorized focusing lens. The power density or light intensity of various regions of the image can be controlled by varying one or more of for example the scanning speed, the size of the area to be scanned, or the density of the scanning pattern.

Application Classes: Display, Projection, Illumination

Several classes of applications may apply the approaches described herein. These application classes include, but are not limited to light projectors that utilize a projector and a screen to form an image on a projection screen, displays such as televisions and control monitors and general illumination devices such as smart lamps and lighting. All applications share, that it is desirable to efficiently illuminate an object or form an image. Some applications might be static, but others can dynamically change the light pattern formed.

Display

Displays can include a projector that is mounted fixed to a surface to be illuminated. The projector can be controlled in such as way as to form an image on the surface by illuminating a reflective or partially reflective surface from the front. It can also be controlled as to form an image by rear-projecting onto a transmissive or partially transmissive surface from the rear. Additional optics can be used to allow varying the distance and angle between the screen and the projector, for example folding mirrors may be used to fold the optical path and place the projector very close to the screen. Lenses may be used to magnify, focus and/or distort the image to match the properties of the projection screen such as dimensions, curvature and surface properties.

Display—TV

Example use cases of such a display include a system to replace televisions and other displays. For example, a light efficient illuminator may be mounted to a retractable or fixed screen using optics that allow very close placement of the projector and screen. The entire system may be mounted to a wall, like a TV. The light efficient illuminator may be mounted at the bottom relative to the screen or at the top relative to the screen. The screen maybe flexible, retractable or solid. It maybe incorporated into a building structure, such as a ceiling or a wall.

Display—Billboards

Billboard displays, digital and static signs and advertising displays are other example display systems that may apply the invention. An example of a billboard is a digital display used to display a sequence of advertising patterns on the shoulder of a highway. The viewing angle of such a display may be optimized in a way that all or most of the light is reflected in the direction of oncoming traffic and not in other directions. A system replacing or upgrading existing paper-based billboards to display digital content may be desirable.

Display—Flight Simulators

Another example of display systems that may apply this invention are flight simulators, used for on ground flight training of airplane pilots. In such an application it may be desirable to achieve efficient image formation on a flat or curved screen or display features that are in focus on a volume rather than on a plane.

Projection Systems

Projection systems a may include a projector and a screen that are aligned so that the projector forms an image on the screen. The screen maybe flat, curved or of arbitrary shape. The screen may have certain reflectance properties, such as a lambertian reflectance profile or a somewhat directional reflectance profile. The screen might be transparent, or partially transparent. It may also be perforated to allow air and other media to pass through it.

Projection Systems: Cinema and Home Cinema

An example of a projection system that may apply this invention are cinema projectors in which a projector mounted above and behind the audience forms an image on a flat or curved large front projection screen. In such a system it might be desirable to achieve very high peak brightness levels (luminance) for some or all parts of the image. An example of a high peak brightness might be a level above 48 cd/m$^2$. Another example of a high peak brightness might be a level above 200 cd/m$^2$. Another example of a very high peak brightness might be 1000 to 10000 cd/m$^2$. Generally a high peak brightness is significantly brighter that the level that a viewer might be adapted to in the viewing environment. In such a system it might also be desirable to achieve high contrast levels (dark compared to bright features). It might be desirable to achieve such contrast levels either sequentially or simultaneously. In such a system it might also be desirable to achieve very pure colours.

An example of a system with similar requirements is a home theatre projector for use in a non-public space and for a smaller audience.

Projection Systems: Planetariums

Another example of a projection system that may apply this invention is a projector in a planetarium. A desirable property of such a system might be that it produces very small and very bright highlights, such as stars within an overall dark or dim scene (the night sky). Another desirable property of such a system might be that the black level is close to or identical to pure black, which means that no or little light is present in dark areas of the scene. Another property of such a system might be that the image is in focus on a non-flat surface, such as the dome inside a planetarium.

Projection Systems: Portable and Personal Projection (Military, Mobile, etc.)

Another example of a projection system that may apply this invention are portable, mobile or personal projectors. One desirable property of such a system might be that it is small in size and/or light in weight. Another desirable property of such a system might be that it uses little power and/or is an efficient system. Another desirable property of such a system might be that it can be operated from a portable power source such as a battery pack or a fuel cell or another type of small generator.

Another desirable property of such a system might be that it does not need a well controlled environment, for example that it can form clearly readable images in a bright environment such as in sun lights. Another desirable property of such as system is that it is easy to setup, which might include that the systems turns on near instantly, that is it in focus on non-flat surfaces or that it undistorts the image, even if no calibrated projection screen is present. Another example of such a system overlays information on physical objects, for example instructions and locations of parts in a machine that requires fixing.

Projection Systems: Head-Up Display

Another example of a projection system that may apply this invention is a head-up display, a display that presents additional information within the field of view of a user, for example on a windshield in a car or on the windows of an airplane. In such a system it is desirable to be able to form an image that is clearly viewable in many viewing environments. For example a desirable property of such a system might be that it is not too bright (blinding) when driving at night, but bright enough to be visible during sunlight. Another desirable property of such a system might be that it is in focus on a non-flat surface. Another desirable property of such a system might be that the image projected by it may be of high quality such that artifacts (e.g. raised black level) related to the image projection do not interfere with the field of view it is overlaying.

Projection Systems: Architectural Structured Illumination and Large Venue Shows

Another example of a projection system that may apply this invention is a projector that forms an image on a building or on a different structure as part of an artistic light show. Another example is the projection onto a stadium floor and/or ceiling. In such a system it might be desirable to be able to form very bright highlights, that are significantly brighter that the surrounding light levels and therefore stick out. It might also be desirable for the system to be very efficient to lower cost of the installation, setup time and cooling requirement. It might also be desirable for such a system to be able to dynamically focus parts of an image or light field onto different planes or objects within a volume.

Illumination and Lighting

Illumination and lighting systems that may apply this invention can be used in applications in which it is desirable to statically or dynamically illuminate objects and not illuminate other objects. In some applications it might be desirable to use an illumination system with the capability to illuminate an entire scene or only parts of a scene simultaneously. Another desirable property of such a system might be that the illumination system closely or approximately resembles the spectral reflectance properties of the objects that are to be illuminated. In some applications the scene to be illuminated may first be analyzed by a camera or other imaging device.

Illumination and Lighting: Automotive

An example of a system that may apply this invention is dynamic or smart automotive headlights. It might be desirable to illuminate an upcoming road sign and the road itself brightly, but at the same time not blind upcoming traffic. It might also be desirable to illuminate the road ahead efficiently. Such a system could work in concert with a camera that analyses the scene ahead and provides a target light profile to the illumination system. Another desirable property of such a system might be that the illumination system closely or approximately resembles the spectral reflectance properties of the objects that are to be illuminated.

Illumination and Lighting: Theater Lighting

Another example of an illumination system based on this invention is a theater spot light. Commonly such spotlights create a bright spot that can be manually or automatically moved to follow for example an actor on a theater stage. It might be desirable to replace such a system with an illumination system that can illuminate the entire stage and create local spot lights dynamically. A desirable property of such a system might be that it efficiently illuminates one ore more objects within the scene. A common data projector is an example of a system that can illuminate a large scene, but is not very efficient when illuminating only a partial scene or object, because light is blocked in regions in which illumination is not required. A system based on this invention may present an efficient alternative. Another desirable property of such a system might be the ability to focus light on objects that are at different distances from the illumination system.

Some light sources, such as lasers light sources, can produce coherent light, which is a desirable property in some embodiments. However, depending on the brightness requirement of the final system output light field, one might require several independent light sources inside the light module or a different type of light source, such as an LED or a broadband lamp. This might result in a non-coherent light profile impinging on a dynamically-addressable light redistributor.

Figure 7:
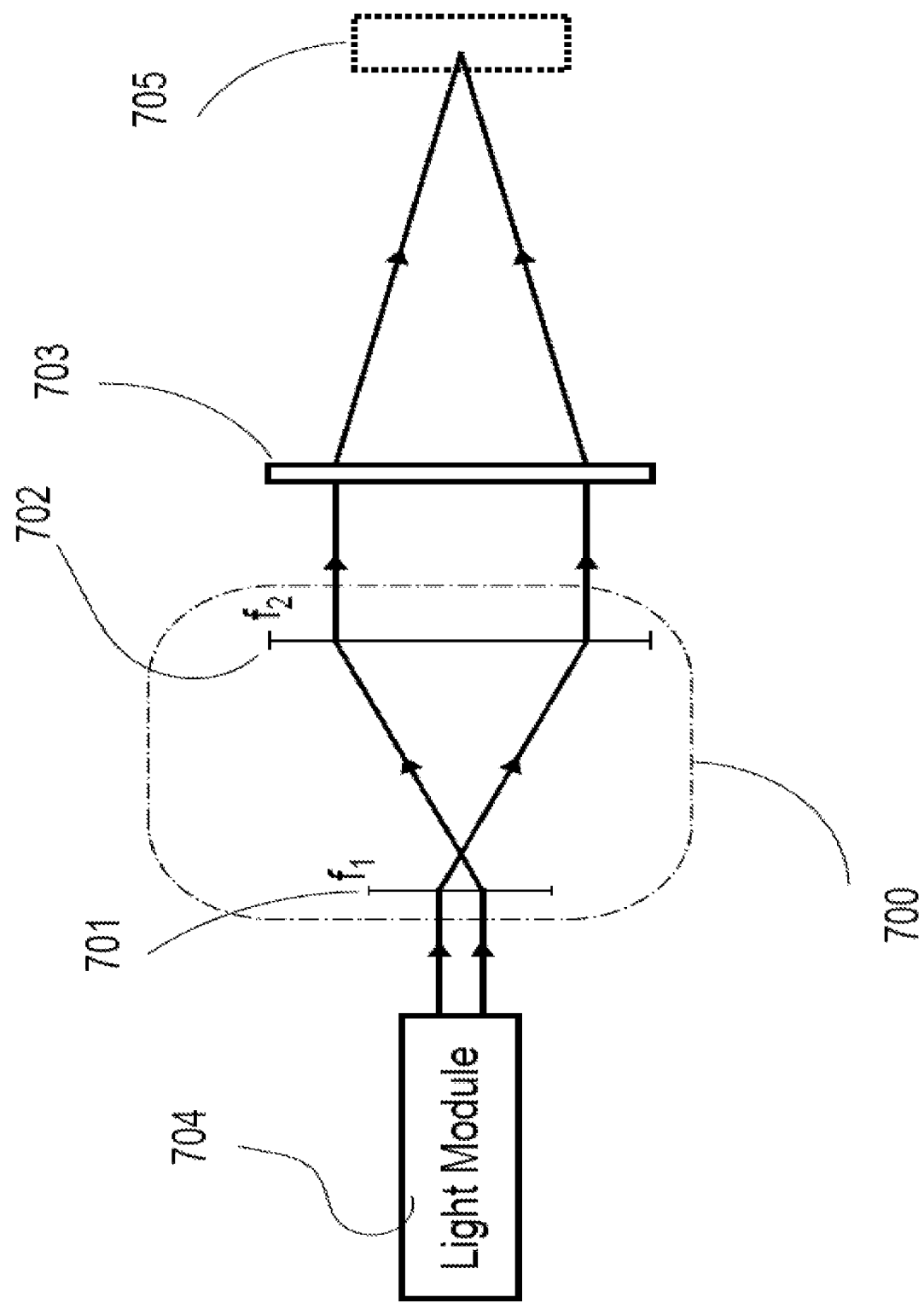
FIG. 7 illustrates example optics of a simple system that does not require (but is compatible with) coherent light.

FIG. 7 shows an example of a system that does not require coherent light. The output from light module 704 is shaped and relayed onto a dynamically-addressable light redistributor 703 using for example an optical module 700 comprising for example two focusing lenses 701 and 702. The objective may be to form an image in the plane 705, which might be a projection screen. Dynamically-addressable light redistributor 703 may be configured, for example with a predetermined phase pattern, to produce the desired light field at 705.

In some embodiments an output light field may be required with higher uniformity than can be achieved with the available optics including the dynamically-addressable focusing element. In this case additional optics (such as integration rods, integrating chambers, optical fibres, etc.)

may be provided to homogenize the intensity profile in one or more subsections of the light field. A coarse initial light field may be produced by the system (by an approach using coherent light or non-coherent light) and presented upon the input port of such additional optics.

Figure 8:
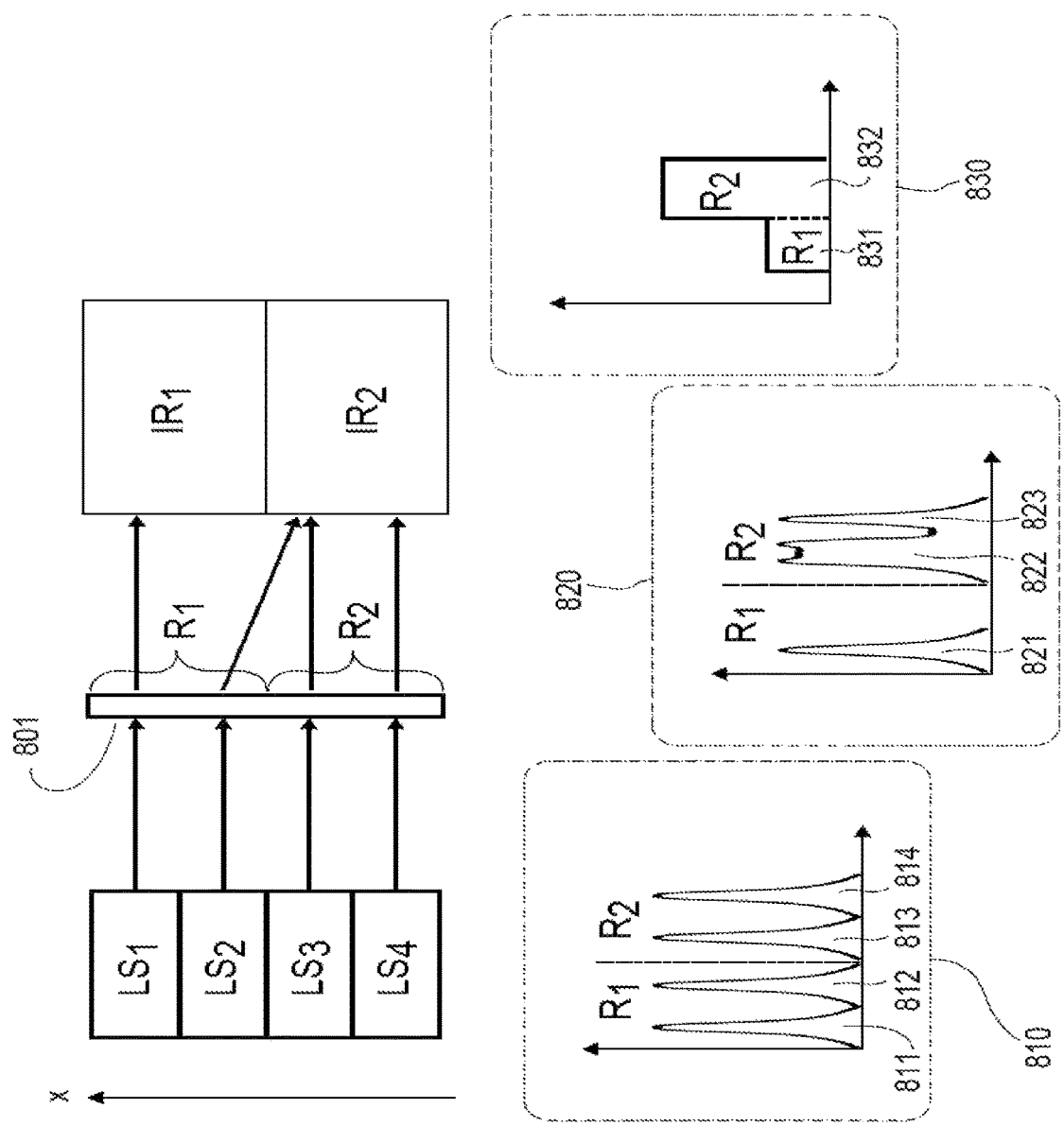
FIG. 8 illustrates example components of a system that re-distributes light and utilizes a clean-up stage (e.g. an array of integration rods) as well as showing example light profiles at each component.

FIG. 8 shows an example case in which a plurality of light sources are arranged to illuminate a dynamically-addressable focusing element 801. The light re-distribution scheme driving the dynamically-addressable focusing element causes the dynamically-addressable focusing element to distribute an initial light field onto an array of integration rods. The output light field of the integration rod array is made up of uniform rectangular fields having intensities at least approximately equal to the total light present at the input port of each integration rod divided by the cross section area of the integrating rod.

For the sake of illustration dynamically-addressable focusing element 801 has been sub-divided into two equally sized regions R1 and R2. 810, 820 and 830 illustrate example light profiles at various stages of this optical system. 810 depicts light profiles 811, 812, 813 and 814 from LS1 to LS4. 811 and 812 are incident on R1, 813 and 814 are incident on R2. Region R1 may be present on integration rod IR1 and region R2 may be present on integration rod IR2. Dynamically-addressable focusing element 801 re-distributes the incident light.

In this example the light from LS2 is re-distributed to integration rod IR2 along with the light from LS3 and LS4. The light from LS1 is present on integration rod IR1. 820 depicts the light profile incident on IR1 and IR2. 821 is present on IR1 and stems from LS1, 822 is present on IR2 and stems from LS2 and LS3 and 823 is present on IR2 and stems from LS4. 830 shows the output light profile from the integration rod array, where 831 shows the output from IR1 and 832 shows the output from IR2.

Figure 9:
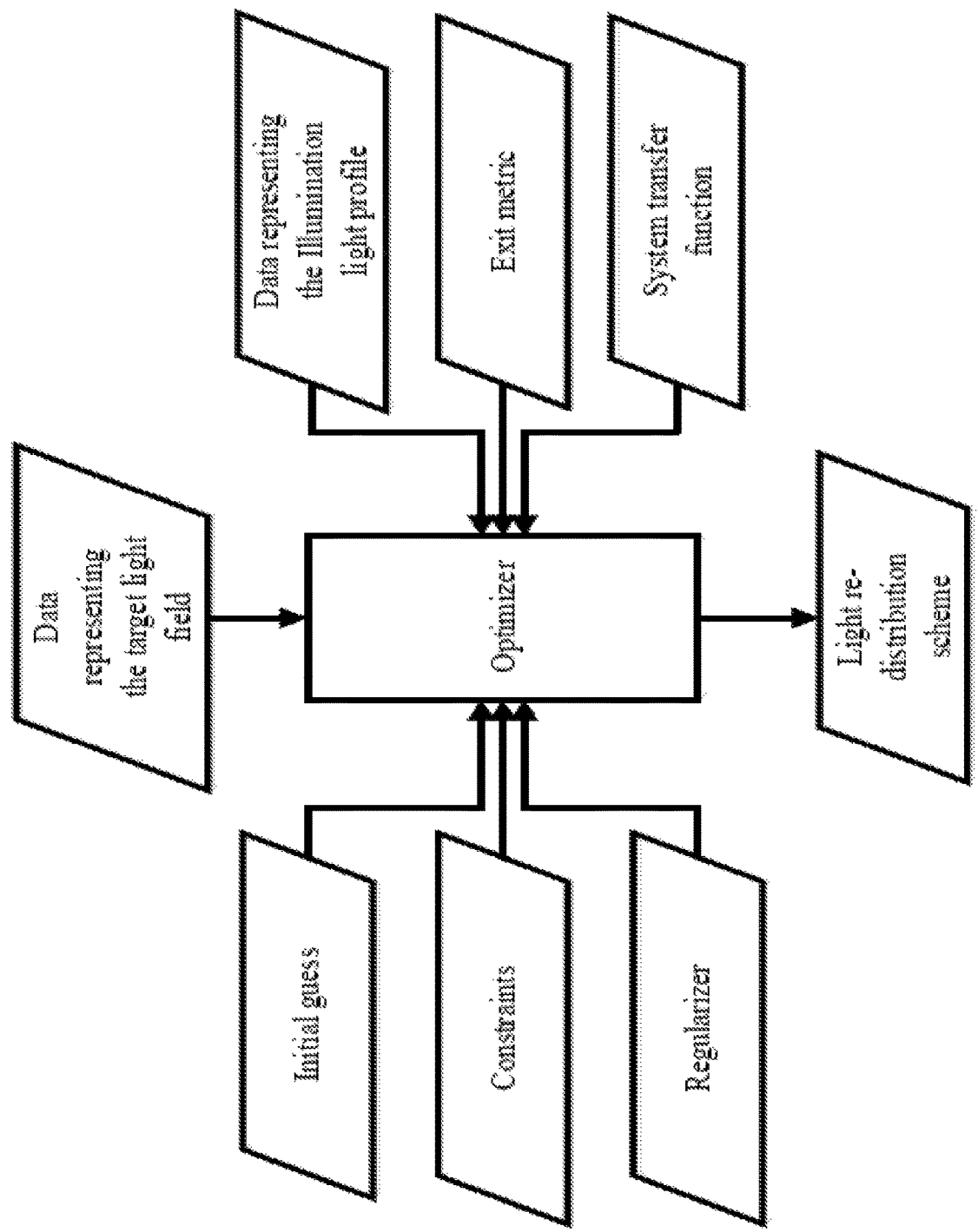
FIG. 9 is a block diagram illustrating operation of an optimization-based method for determining phase shifts to apply to different areas of a dynamically-addressable focusing element to create a target light field (or iterative program required to operate the system in 'exact mode').

FIG. 9 depicts an example framework of a program to be executed on the system processor. Its purpose is to compute a light re-distribution scheme (for example in form of a 2D array of phase retardation values) that, then be addressed onto the dynamically-addressable focusing element to, in combination with the input illumination profile and system optics cause an output light profile that closely matches the target light field.

FIG. 9 illustrates an iterative method to finding a solution using a minimization or optimization approach based on a forward model and its inverse. This example shows an iterative method "the optimizer" that finds a solution using a minimization or optimization approach based on a forward model and its inverse. An initial guess of the light re-distribution scheme as well as regularization terms may be utilized to converge towards a suitable solution in fewer iterations. System constraints may also be supplied. An exit metric, for example the maximum number of iterations, a residual, or a perceptual metric, determines when the program stops and outputs the current solution in form of a light re-distribution scheme.

In alternative embodiments a metric may determine when the current solution is ready to be applied to drive a PMD. After this occurs, the program may continue iterating to find a better solution. As better solutions are obtained they may be applied to drive the PMD. In an example embodiment, after a set number of iterations (e.g. 3, 4, 10, a few iterations) the current best phase pattern solution may be applied to the PMD while the computer/algorithm continues to calculate better solutions. After another few iterations a new (and better) solution may be available and can be addressed on the PMD. All this can happen within fractions of a frame of a video.

An example of a pair of a forward model and its inverse model is a two-dimensional Fourier transformation and a two-dimensional inverse Fourier transformation, which could be used as an approximate model for a coherent, collimated beam of light passing through a lens.

In another example, the forward model may describe the amount of deflection caused by a difference in phases or light path lengths of neighbouring regions on the PMD when illuminated by light, as well as the resulting intensity profile. Although an exact inverse system model may not exist, an iterative optimization approach may be used to solve for an approximate solution of the phase pattern to be addressed on the PMD.

Figure 10:
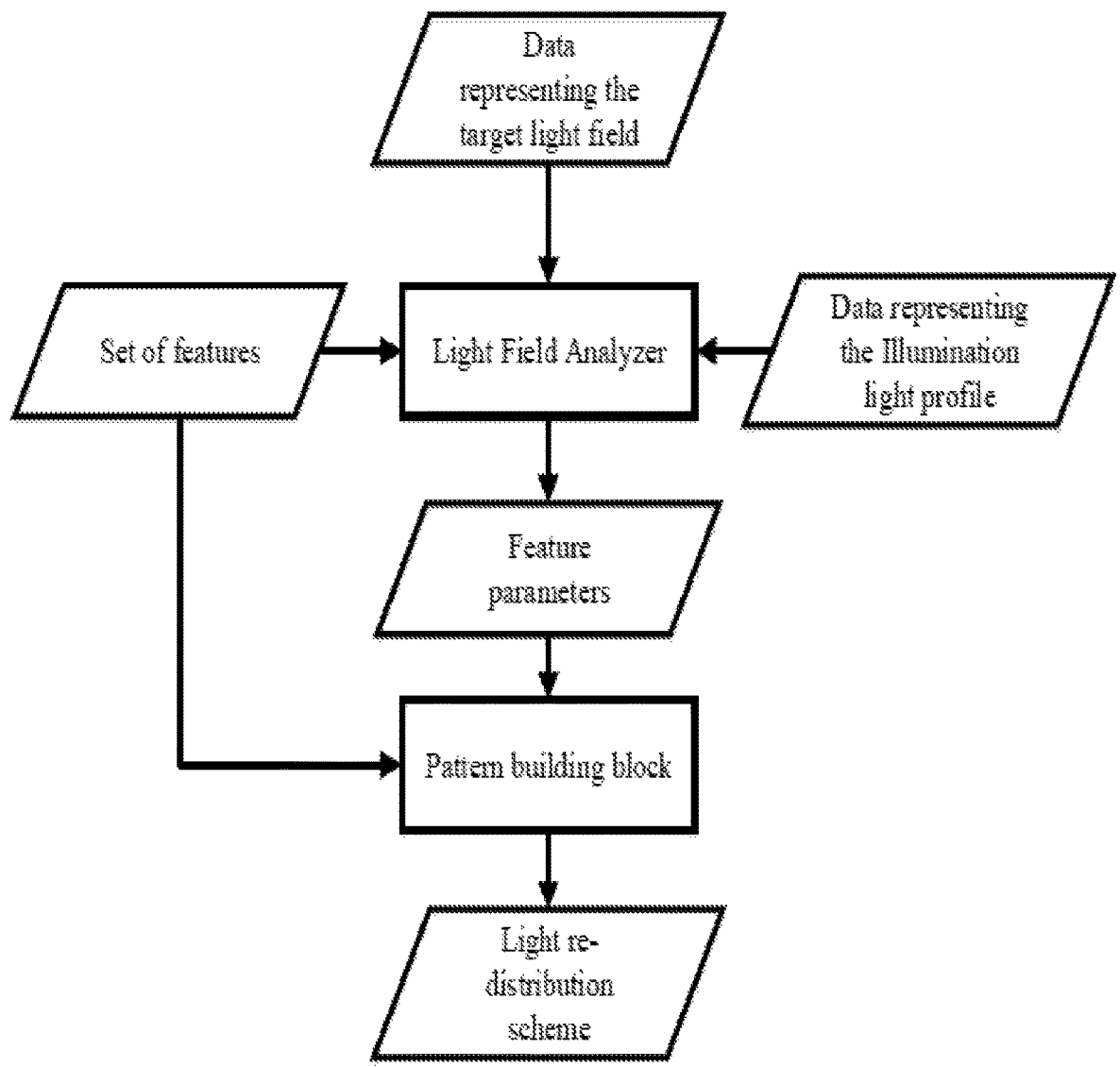
FIG. 10 is a block diagram illustrating a procedural method for creating an approximation to a target light field.

FIG. 10 depicts another example framework of a program that may be executed on the system processor. Its purpose is to compute a light re-distribution scheme (for example in the form of a 2D array of phase retardation values) that, when addressed onto the dynamically-addressable focusing element will, in combination with the input illumination profile and system optics cause an output light profile that closely matches the target light field or an output light field that may require further optical or other treatment to produce the desired target output light field.

The method of FIG. 10 creates an approximation of the full target light field using a number of component light fields that may be added together. Examples of such components may be rectangular shaped uniform light fields or Gaussian light fields.

This example shows a procedural approach (non-iterative) that has access to a set of features, such as virtual optical elements (described by for example their shapes, sizes and positions on a PMD and its resulting light field which can be either pre-computed or provided in functional form as well as description of parameters that may be varied by the program). Each such feature, when applied to the PMD results in a related output component light field. A light field analyzer compares such features, in particular the resulting output light fields to the target light fields and determines a set of feature parameters for a plurality of features. These are combined into a final light re-distributing scheme in the pattern building block.

As an example, one virtual optical element may produce a Gaussian intensity profile as its output. The peak-intensity and full-width half-maximum may be described directly when the virtual optical element is formed on the PMD. A superimposed set of such Gaussians may resemble the target light-field when relayed on a display screen.

Figure 11:
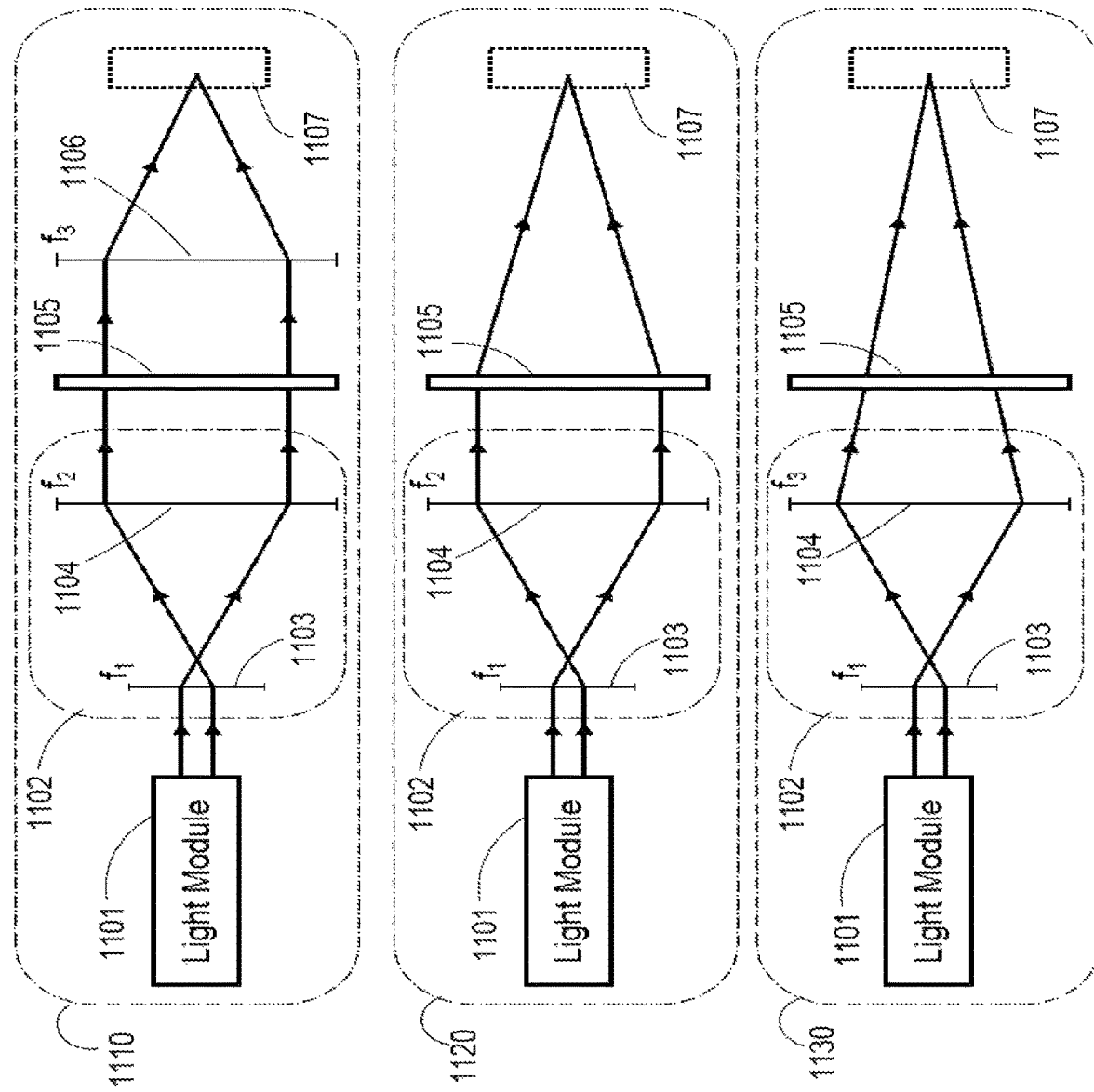
FIG. 11 shows three examples of an optical setup for use with coherent light.

FIG. 11 shows three examples of optics and the light field that may be used where coherent light is present on the dynamically-addressable focusing element and a system transfer function (forward model), such as can be described by a two dimensional Fourier transformation is desired. Example a) uses coherent and collimated light present on the dynamically-addressable focusing element followed by a field lens to focus light. Example b) achieves a similar result, however the field lens is represented as a path length varying pattern that can be superimposed with the desired light redistribution scheme. Example c) provides similar results, utilizing a slightly converging beam.

Common for all three implementations is that coherent or partially coherent light from a light module 1101 is expanded using expansion and beam shaping optics 1102 and the light is incident on the PMD 1105. 1102 may comprise two or more focusing elements 1103 and 1104. In 1110, the light incident on 1105 is collimated. The output light from 1105 is focused by focusing lens 1106 onto 1107 in the case when 1105 does not change phase or changes phase uniformly across the device.

In 1120, the light incident on 1105 is collimated. The output light from 1105 is focused onto 1107 in the case when the phase retardation pattern on 1105 resembles a lens or an approximation thereof.

In 1130, the light incident on 1105 is not collimated, but converging to focus at 1107 in the case when 1105 does not change phase or changes phase uniformly across the device.

In all three implementations, 1105 is configured in such a way as to produce an approximation of a desired target light field at 1107, for example at a projection screen.

Figure 12:
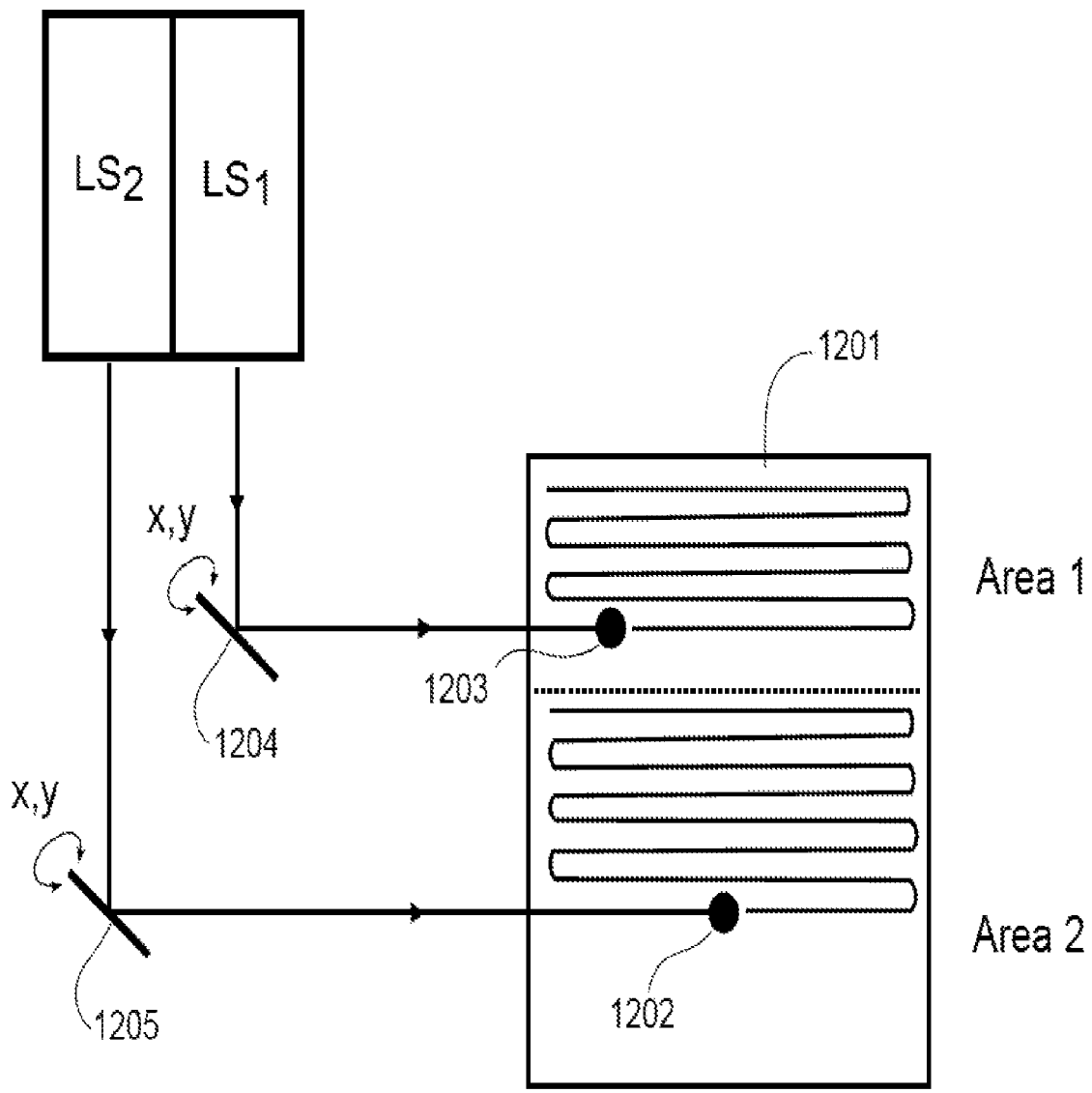
FIG. 12 shows example optics for a variable laser scanning approach.

FIG. 12 shows an example of variable scanning optics in which two laser beams or other light beams collectively scan an area. This scheme may be expended to any suitable number of light beams. Each light beam scans a region within the area. By altering the sizes of the scanned regions the luminance within each region may be varied. The dimensions of the scanned regions may be changed, for example, the scanned regions may be rectangular and the lengths and widths of the scanned regions may be changed, thereby altering the areas of the scanned regions. The scanning speed and pattern may remain fixed as the size and/or shape of a scanned region is changed or may be altered. For example, scanning speed may be reduced when the scanned region is smaller and increased when the scanned region is larger.

In the example implementation illustrated in FIG. 12 a plurality of light sources such as lasers LS1 and LS2 are used in conjunction with for example steerable MEMS mirrors that allow the beams to be scanned across different areas. In this example LS1 illuminates Area 1 and LS2 illuminates Area 2. Together, LS1 and LS2 illuminate the entire imaging area 1201.

LS1 provides a beam of light incident on a two-axis scanning mirror 1204 that scans the beam 1203 over Area 1. LS2 provides a beam of light incident on a two-axis scanning mirror 1205 that scans the beam 1202 over Area 2. The beams 1203 and 1202 may be scanned over the respective areas in a line-by-line fashion or any other desired path. In this example Area 1 is of a different size than Area 2. Therefore the scanning speed of 1202 maybe increased order to scan over Area 2 in the same time required for 1203 to scan Area 1. Provided that LS1 and LS2 are of same or similar intensities, the resulting average intensity of Area 1 may be higher than that of Area2. Other scanning patterns, scan speeds, pattern densities, light source modulation or intensities may be utilized to achieve a similar effect.

In some embodiments, an image data processor divides the image into equal area sections, each section being illuminated by one light source each with a modulated amplitude according the requirements of the individual areas.

In some embodiments, the illumination comes in the form of a uniform field that covers its whole subsection. In some embodiments, the image sections comprise differently sized areas of equal light energy of one or more of the present frequencies in the image (colours), so that each sub-section and frequency may reach different peak amplitudes.

In some embodiments, the illumination comes in the form of a spot light source which is scanned across its subsection of the screen, for example using a laser and a mirror mounted on a rotational 2-axis mirror.

In some embodiments, the illumination comes in the form of a line light source which is scanned across its subsection of the screen, for example using a laser and a mirrors mounted on a rotational 1-axis mirror.

In some embodiments, each image subsection is illuminated with a sequence of random illumination patterns, each generated by an image data processor that ensures that the resulting image is in accordance with the input image data.

In some embodiments, the projection system comprises differently sized areas of equal light energy of one or more of the present frequencies in the image (colours). Each subsection goes through spatial light amplitude modulation, for example by an SLM In some embodiments, the projection system comprises differently sized areas of equal light energy of one or more of the present frequencies in the image (colours). Within each subsection, the scanning is done at variable speed, but with a constant intensity, so that the perceived subsection varies in intensity. A controller may be configured to ensure that each subsection while scanned at variable speeds within each subsection still completes to total subsections in the same amount of time.

In some embodiments the required scanning speed is high and instead of a motorized mirror, diffractive dynamic elements such as acousto-optical modulator or acousto-optical deflectors are applied to scan the light used.

Figure 13:
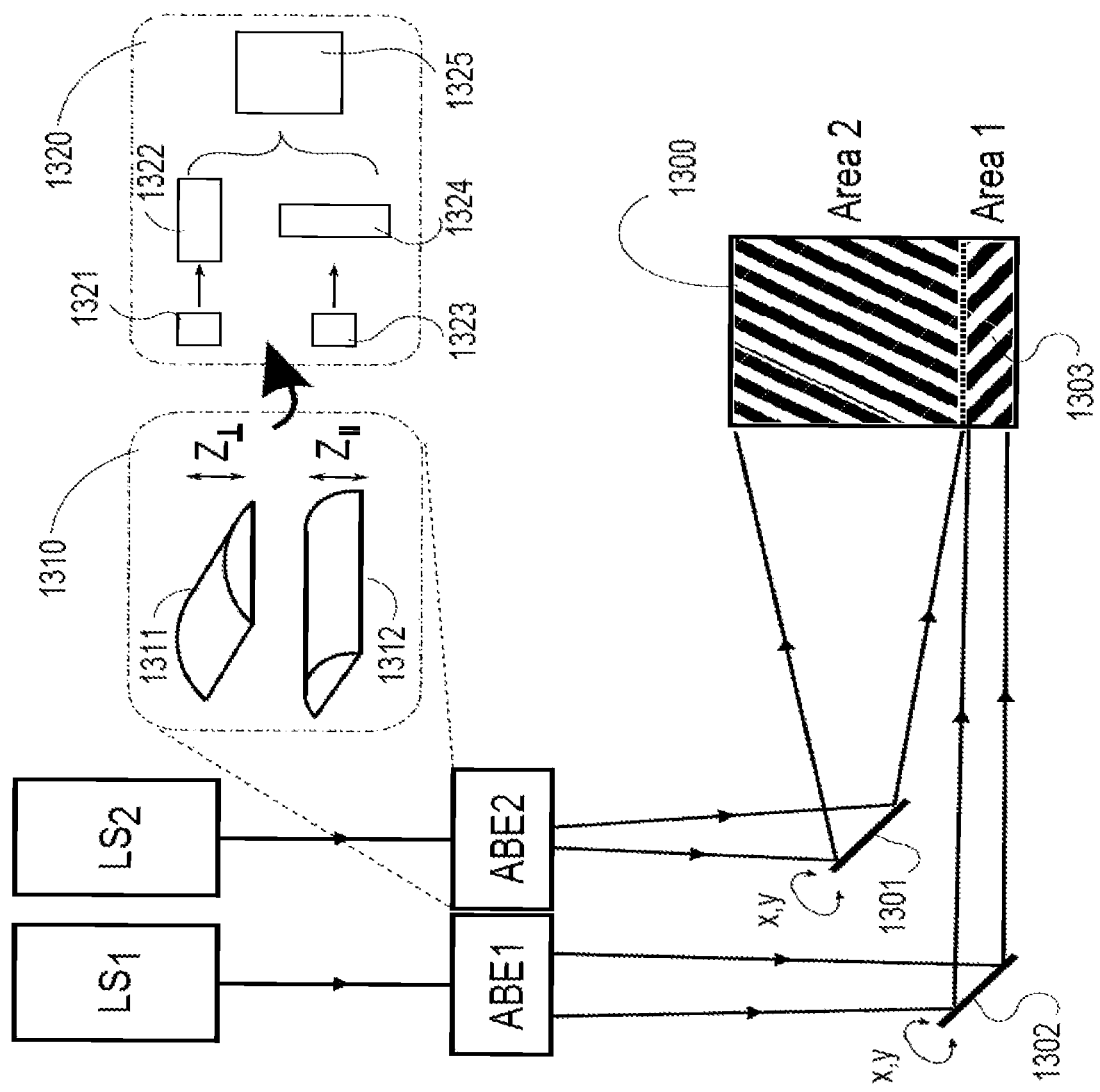
FIG. 13 shows example optics of another variable laser scanning approach (with dynamically focusable lenses or other optics).

FIG. 13 shows example variable laser scanning optics which is an alternative to the implementation depicted in FIG. 12. In FIG. 13, each light source is relayed onto a respective area not as a scanning beam, but as a complete field expanded using beam shaping and expansion optics.

Beam LS1 is shaped and expanded using the asymmetric beam expander ABE1. The expanded light profile is then steered using a two-axis scanning mirror 1302 onto Area 1 of the image. Similarly, LS2 is shaped and expanded using the asymmetric beam expander ABE2. The expanded light profile is then steered using a two-axis scanning mirror 1301 onto Area 2 of the image.

Asymmetric beam expander ABE2 is explained in 1310 and 1320. 1310 shows how the incident beam is expanded by different amounts in two perpendicular directions using the cylindrical lenses 1311 and 1312. In its default configuration, the input beam profile which may be in the form of a focused spot, will result in the output light profile being a square and uniform intensity beam. If a rectangular shape is required, one or both of the cylindrical lenses 1311 or 1312 may be moved by for example a motor along the optical axis of this system. Moving 1311 will change the square shape 1321 into shape 1322. Likewise, moving 1312 will change the square shape 1323 into shape 1324. If both lenses 1311 and 1312 are moved, the output light profile may be as depicted in 1325. In addition to shaping the individual beams, the output light profiles from ABE1 and ABE2 may be steered by 1301 and 1302 so that their combined illumination from 1300 and 1303 fills the complete image.

Figure 14:
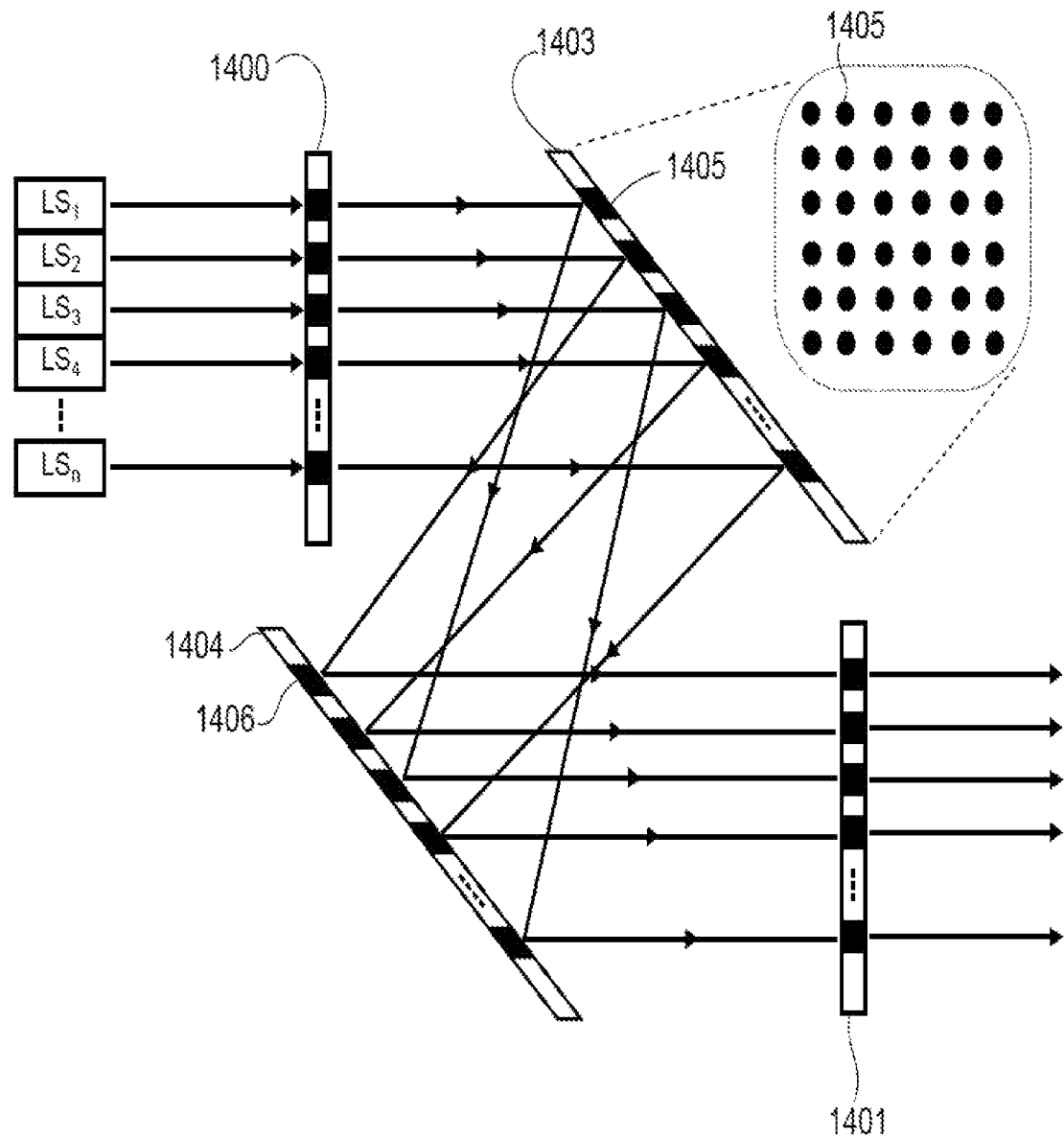
FIG. 14 is an example of an optical switch using MEMS (micro electromechanical systems).

FIG. 14 shows an example application of optical switches to remove light from a first area and direct that light to a second area. The first area becomes dimmer and the second area becomes brighter as a result.

In FIG. 14, a plurality of light sources LS1 to LSn provide input beams onto an array of input ports 1400, for example via optical fibres. The light from each input port is present on device 1403 comprising one or more elements such as 1405 that steers the light. 1405 could for example be a two-axis controllable mirror. This light can furthermore be relayed off a secondary device 1404 comprising one or more elements such as 1406 that steers the light towards an output array of output ports. In one embodiment, the input light beams provided by the light sources are collimated and remain collimated at the output port 1401.

Figure 15:
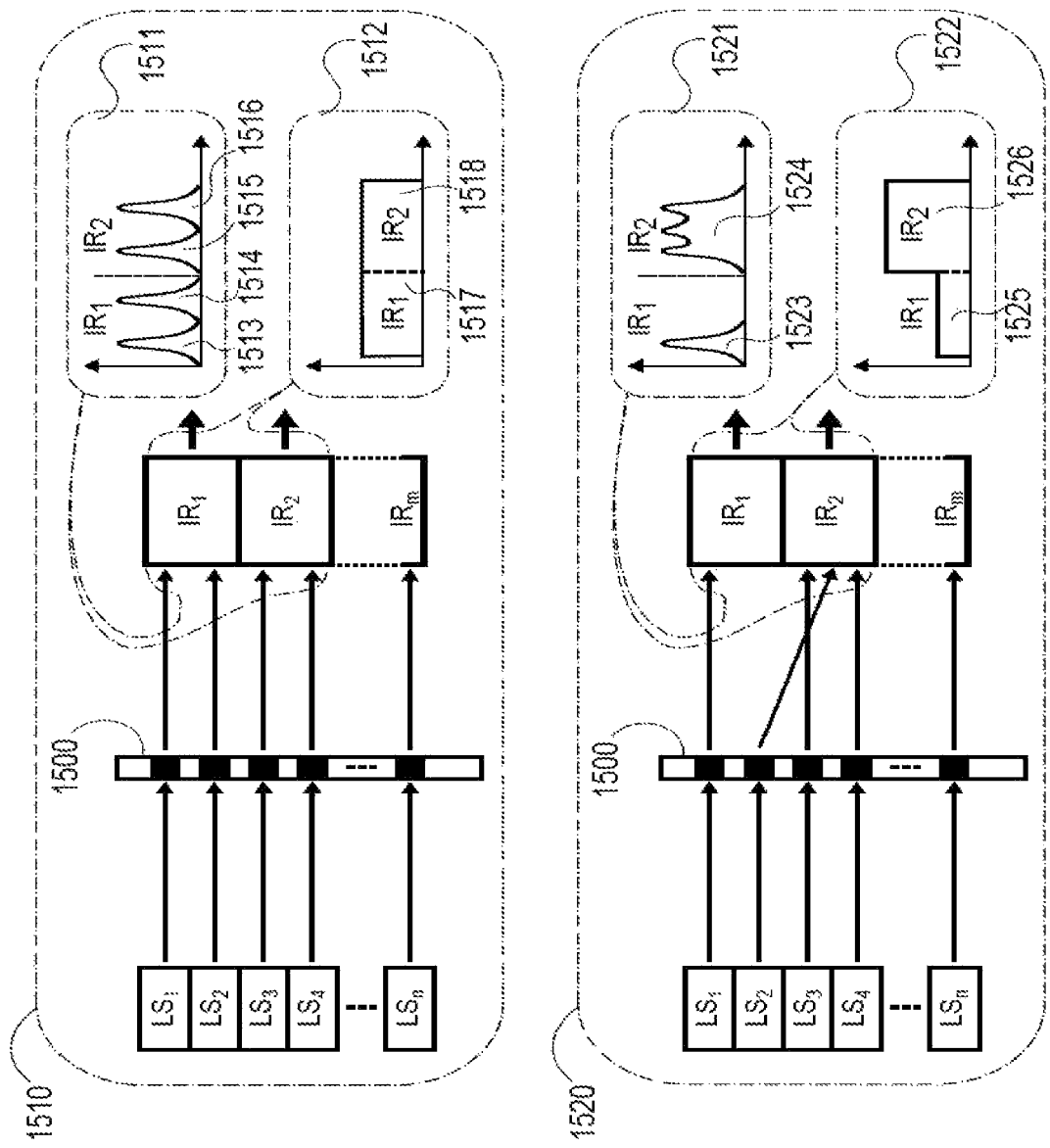
FIG. 15 is an example of how an optical switch or other light re-distributor can be used in concert with a clean-up module (e.g. an array of integrating rods).

FIG. 15 depicts an implementation of a light-efficient illuminator using optical switches and a clean-up module such as an array of integrating rods IR1, . . . , IRn 1510, a plurality of light sources LS1 to LSn provide input beams onto an array of input ports 1500, for example via optical fibres. These beams are further directed onto a clean-up module, for example an array of integration rods IR1 to IRn. In this example, LS1 and LS2 are incident on IR1, LS3 and LS4 are incident on IR2 and so forth. 1511 shows the incident light profile on IR1 and IR2. 1513 is the light stemming from LS1. 1514 is the light stemming from LS2. 1515 is the light stemming from LS3. 1515 is the light stemming from LS4. The remaining integrating rods in this system can be described in a similar matter. 1512 shows the output light profile from integration rods IR1 and IR2, and illustrates how the non-uniform input profiles have been made uniform. The average intensity of 1517 is approximately that of the average intensity of 1513 and 1514 combined or integrated. The average intensity of 1518 is approximately that of the average intensity of 1515 and 1516 combined or integrated.

In 1520 shows the same system with steering. In this example, LS2 is steered away from IR1 and into IR2, thereby reducing the intensity output from IR1 and increasing that of IR2. 1521 shows the input light profiles onto IR1 and IR2. 1523 shows the input light profile from LS1 onto IR1. 1524 shows the combined light input from LS2, LS3 and LS4 onto IR2.

1522 shows the output light profile from integration rods IR1 and IR2. The average intensity of 1525 is approximately that of the average intensity of 1523. The average intensity of 1526 is approximately that of the average intensity of 1524 combined or integrated.

Figure 16:
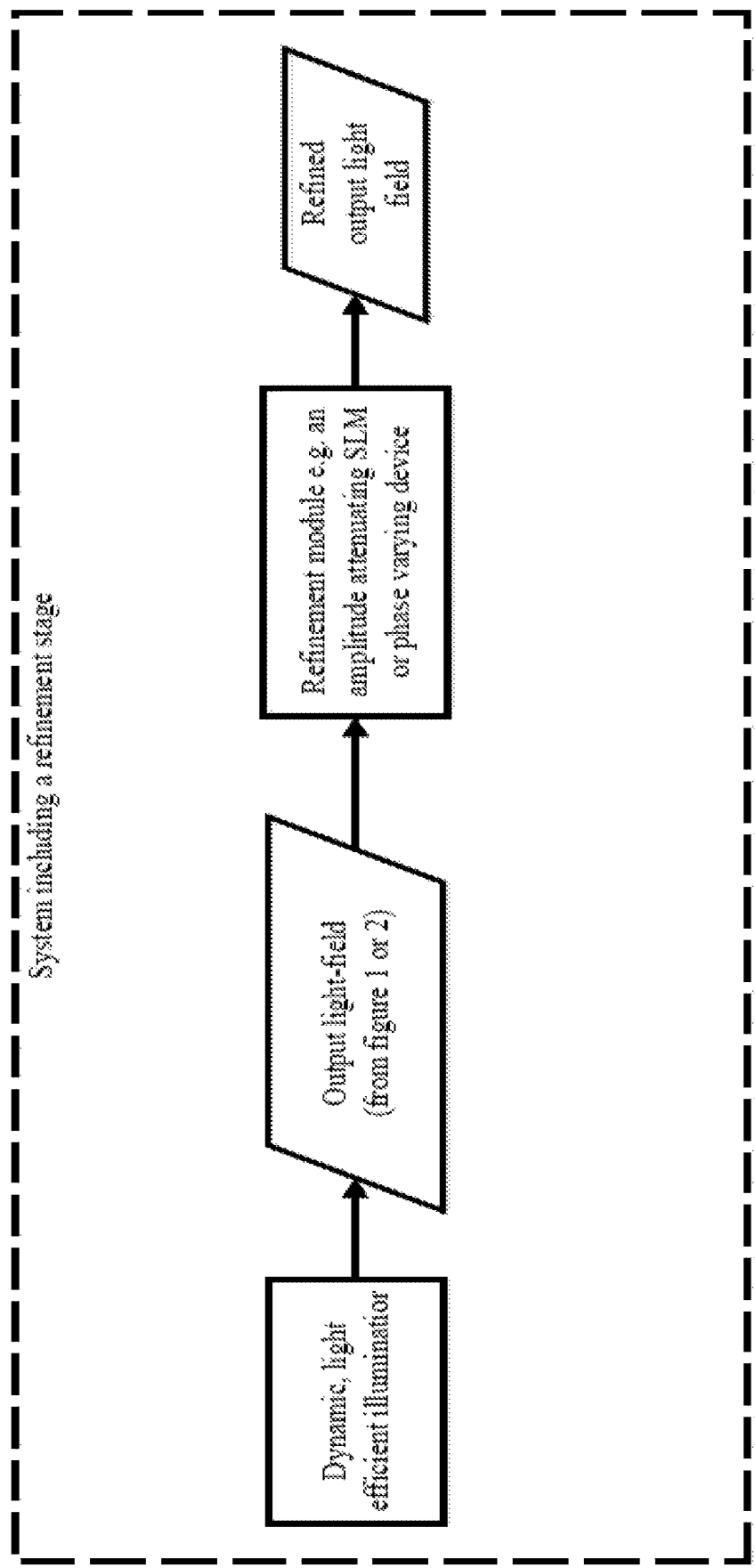
FIG. 16 is a block diagram of a system including a refinement module (e.g. a light efficient illuminator in combination with a spatial light modulator (SLM).

FIG. 16 illustrates an embodiment which applies a refinement module (for example a DMD) to fine tune a light field.

The output light field of a device as described herein may be used as a controllable light source to illuminate a refinement stage which may include an imaging device, like a DMD, an LCD, or an LCoS. The imaging device may comprise an amplitude modulating SLM, a PMD, a diffusive device, like a DMD, an LCD, or an LCoS. Refinement may provide a refined output that may improve the quality of the output light-field of the complete system. The refinement module may comprise a de-speckling module, a polarization-varying device, a colour-enhancing device etc.

The refined output light-field may be imaged or relayed onto a projection screen or the like in the usual manner. As shown in FIG. 16, a light-efficient illuminator may be combined with one or several refinement modules which may be arranged in serial and/or parallel configurations.

For example, the refinement module may provide high spatial frequency detail to the final light-field that can now be imaged or relayed onto a projection screen or the like on top of the output light-field from the light efficient illuminator.

Another use of the refinement module is to minimize visual artifacts introduced by the light efficient illuminator. In some implementations, these improvements may be executed in accordance with analysis of the light efficient illuminator output as well as models of the human visual system such as colour appearance models, visual difference predictors or other models.

In a preferred embodiment, the dynamic light efficient illuminator provides a first low quality version of the target light field, for example low spatial resolution colour image, as input to the refinement module. The refinement module may comprise a single spatial amplitude modulator of high spatial resolution relative to the colour image and provide luminance modulation only. The combined output may be different from the target light field in an absolute sense, but perceptually comparable.

Figure 17:
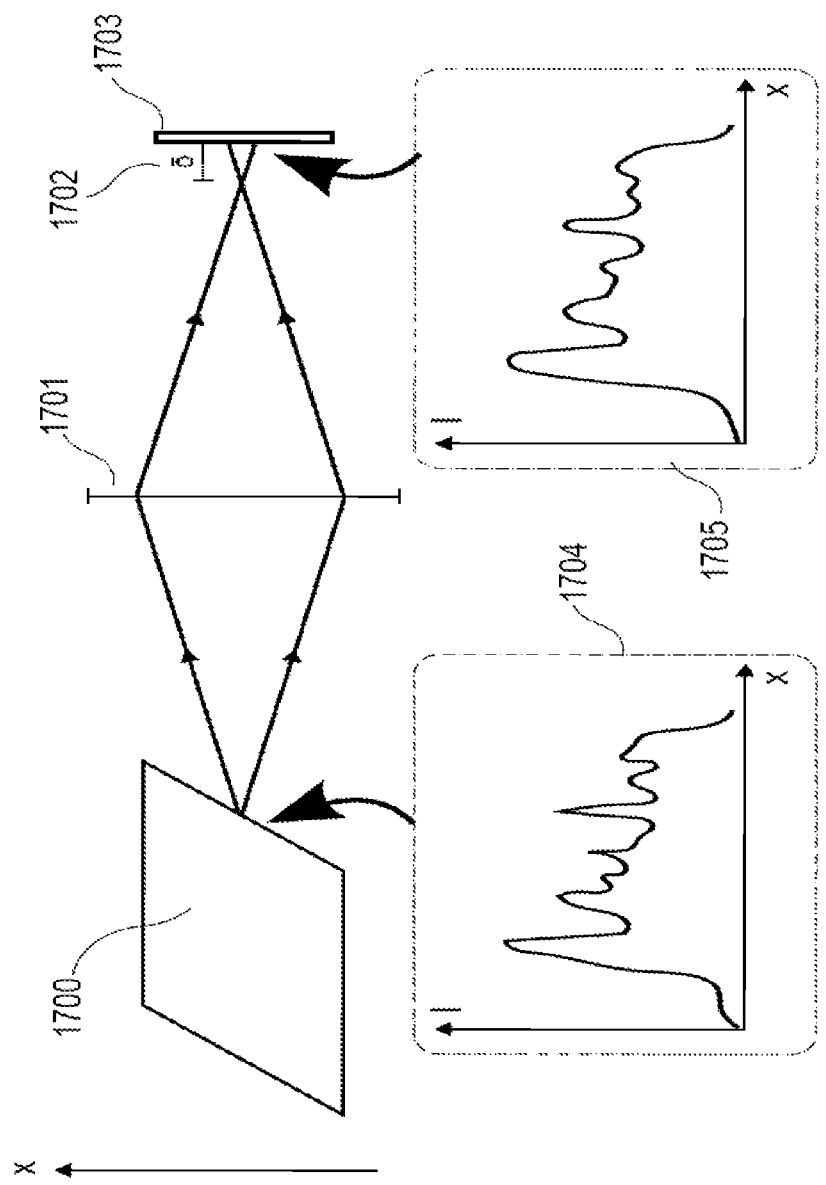
FIG. 17 shows example optics of a system including a refinement module. It also depicts example light profiles at the output of the light efficient illuminator and at the input of the imaging device (e.g. SLM).

FIG. 17 depicts an example optical implementation as well as light profiles present at various stages of a light efficient illuminator with a refinement module. The output light field 1700 from the light efficient illuminator is relayed onto the refinement module 1703 via for example a relay lens system 1701. 1704 shows an example output light profile produced by the light efficient illuminator. 1705 shows an example light profile incident on the refinement module 1703. In some embodiments it may be preferable not to focus the output of 1700 exactly onto 1703, but instead blur or spatially low-pass filter 1704 by moving 1703 by an amount 1702.

Figure 18:
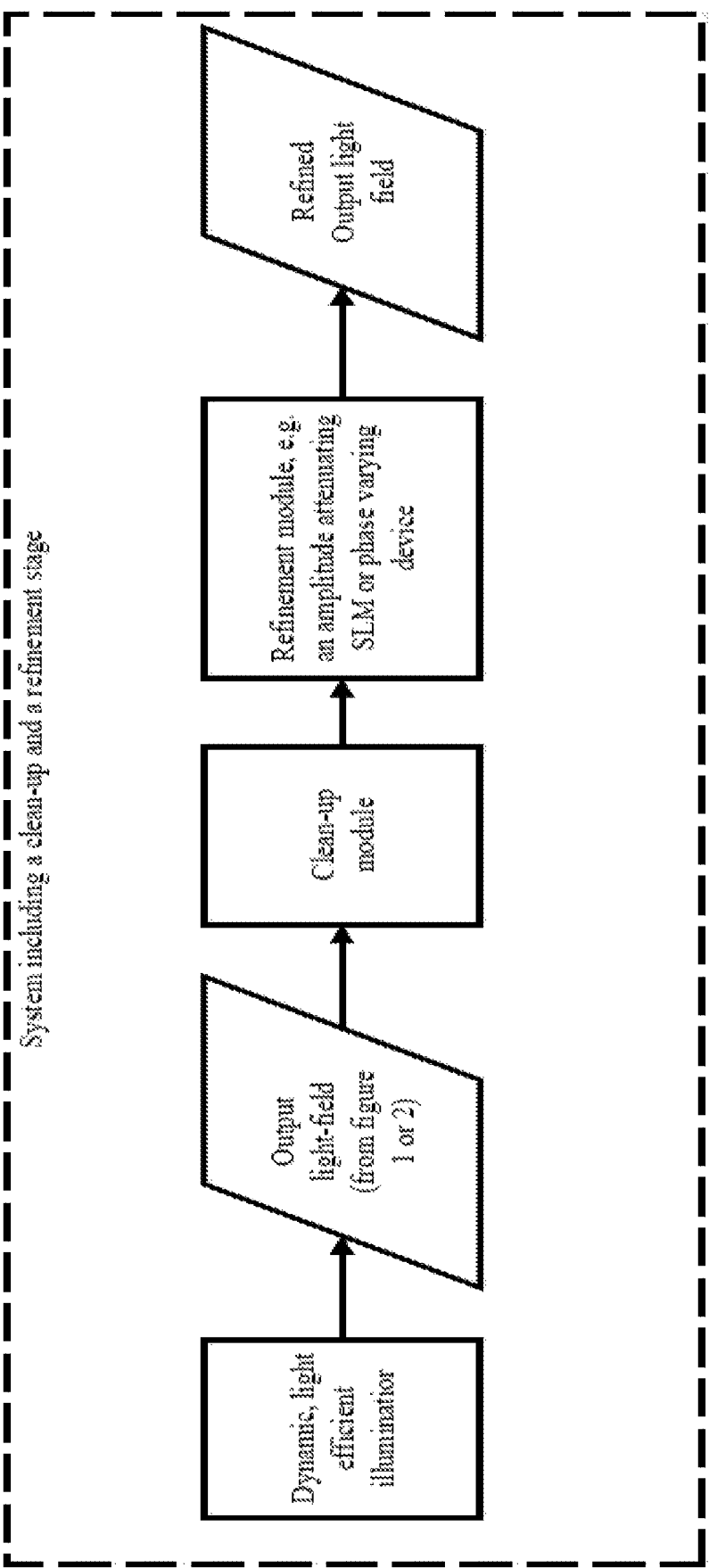
FIG. 18 is a block diagram of an illumination system including a clean-up stage and a refinement stage.

FIG. 18: illustrates an embodiment comprising a refinement module (for example a DMD) and a clean-up module (for example an integration rod array).

Certain applications may require that the output light field be of high fidelity, uniformity, or predictability. In some cases an output light field may include undesirable sharp spikes or other optical noise not specified for the target light field. One could reduce these issues by providing an array of homogenizing elements such as an array of independent integrating rods or a bundle of fibers or a number of optical waveguides between the illuminator and the refinement module. The spatially-varying output light-field is then reduced to a number of known intensity profile regions matching the number of homogenizing elements (e.g. fibers or integrating rods) used. The benefits of steering light into a number of integrating rods, fibres or regions may include enhanced contrast, improved black-levels, higher peak-intensities, and/or improved predictability of the output light profile. Additionally, as light that would otherwise pass through one homogenizing element can be redirected into another homogenizing element, the resulting peak luminance can in the best case be increased by approximately the number of regions (e.g. all or most of the light could be directed into one of the homogenizing elements). By contrast, in a system that does not redirect light but merely attenuates light to achieve desired luminance levels, the peak luminance is limited to the global luminance level that the system's light module can provide.

Figure 19:
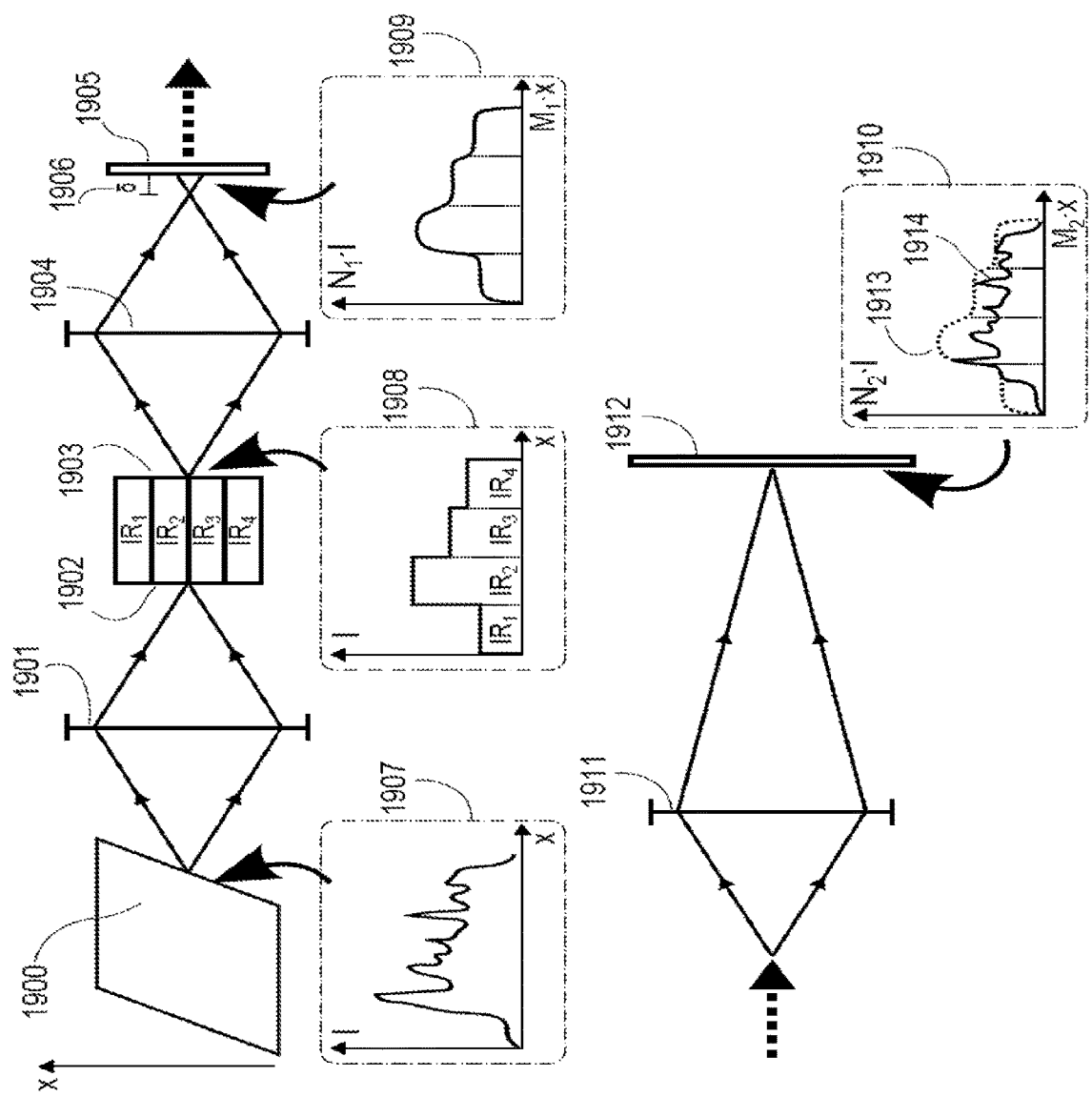
FIG. 19 shows example optics of a system including a clean-up stage and a refinement stage. It also depicts example light profiles at each stage.

FIG. 19 depicts an example implementation of a light-efficient illuminator combined with a clean-up module and a refinement module. The output of the light-efficient illuminator 1900 is relayed using for example a lens 1901 onto an array of integration rods 1902, IR1, IR2, IR3 and IR4. The output 1903 of the array of integration rods is further relayed onto 1905 using for example a lens 1904. 1905 represents the refinement module, for example in the form of an amplitude-modulating SLM. The output of 1905 is relayed onto for example a projection screen 1912 using for example a lens 1911. An example output light-field from 1900 is depicted in 1907. The light profile incident on 1905 may be blurred using a small offset 1906, turning the light profile 1908 at 1903 into 1909 at 1905. 1910 shows the final output light-field from the complete system, where 1913 represents a relayed version of 1909 modulated to 1914 by 1912.

Projection systems as described herein may comprise multiple stages of modulation. One or more stages may modulate phase of the light, and/or one or more other stages modulate the light's amplitude, and/or one or more other stages modulate the light's frequency, and/or one or more other stages modulate the light's polarization. For example, one projection system could have two spatial amplitude modulators, and one spatial phase modulator.

Such stages may be arranged to process light in a serial or parallel fashion, or a mix thereof. In the parallel case, different light fields can be combined by a beam-splitter or beam-combiner, for example a dichroic mirror in order to combine light of different frequencies, or a polarizing beam-splitter in order to combine light with different polarizations. For the serial case, the output of one stage is used as the input for the next stage. For example, one system can use a frequency modulator in parallel with a phase modulator, both of which are placed in series with a spatial amplitude modulator. The two parallel stages can be combined by a beam-combiner before they are relayed onto the spatial amplitude modulator which is placed in series with the parallel stage.

Figure 20:
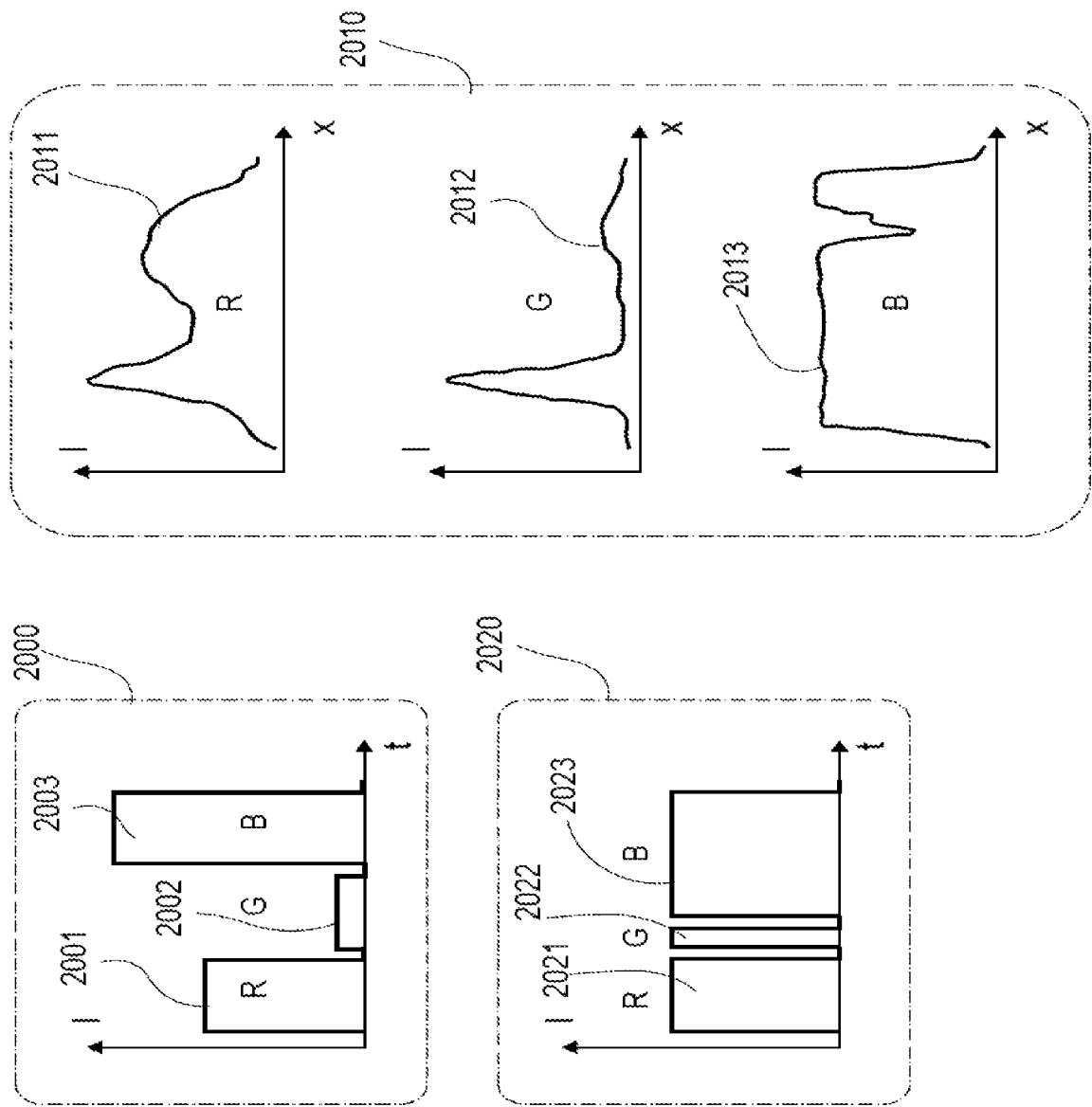
FIG. 20 shows intensity-time and intensity-location plots of a time-multiplexed or color field sequential system. Two example methods use two different timing schemes.

FIG. 20 shows intensity-time and intensity-location plots in a system employing a color field sequential scheme. 2010 indicates an example of a desired spatial cross-sectional light profile in a three-primary light-efficient illuminator made up from a red (2011), a green (2012) and a blue (2013) channel. Since the light-efficient illuminator achieves its target light profile by re-distributing light rather than exclusively amplitude-modulating light (by attenuation), the total amount of light required by each light source is proportional to the integrated light of each colour channel light profile, 2011, 2012, and 2013 respectively for R, G, and B. In this particular example, one can inspect the light profiles 2011, 2012 and 2013 and deduce that a lesser amount of green light is required, an intermediate amount of red light is required, and a largest amount of blue light is required.

The total amount of light for each color within one video frame in a color field sequential drive scheme can either be modulated at the source by reducing the intensity of individual light sources over a fixed period of time as depicted in 2000, or by a fixed intensity over varying amounts of time as depicted in 2020 or by a combination of these two schemes, not depicted here. In 2000 the intensity modulating approach is depicted for red by 2001, green by 2002 and blue by 2003. In 2020 the time modulating approach is depicted for red by 2021, green by 2022 and blue by 2023.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, video projectors, displays (such as televisions), digital cinema projectors, media players, and other devices suitable for the purposes described herein.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for displaying an image, the image having a luminance that varies from place to place, such that the image has darker areas and lighter areas, the method comprising:

receiving at a controller image data defining the image for display, wherein the image data describes a target light field;

delivering a delivered amount of light based on the image data, wherein the delivered amount of light is comprised of light from each of a plurality of light sources to illuminate a plurality of corresponding areas of a screen wherein each area corresponds to illumination with a selected amount of light for that area, wherein the plurality of light sources are coupled to the controller;

analyzing the image data defining the image for display from the plurality of light sources to the screen, receiving by a dynamically addressable light re-distributor the light from each of the plurality of light sources, wherein the dynamically addressable light re-distributor is coupled to the controller that is configured with a light distribution scheme, the dynamically addressable light re-distributor comprises receiving optics and a dynamically-addressable focusing element, wherein the receiving optics receive an incoming light profile formed by the light from the plurality of light sources and transform the incoming light profile into an illumination light field that substantially matches a size, shape and angular acceptance range of the dynamically-addressable focusing element, and wherein the dynamically-addressable focusing element is controlled by distribution data that corresponds to the light distribution scheme, and in response to the image data defining the image and the light distribution scheme, dynamically redistributing with the dynamically-addressable focusing element the light displayed to the screen in a non-subtractive manner and by altering sizes of the plurality of corresponding areas that receive the selected amount of light for that area such that the corresponding areas located in the lighter areas of the image are smaller and the corresponding areas located in the darker areas of the image are larger, wherein the amount of light delivered from the dynamically addressable light re-distributor to the display after passing through the dynamically-addressable focusing element substantively does not change compared to the amount of light delivered to the receiving optics of the dynamically addressable light re-distributor.

2. The method according to claim 1 wherein the corresponding areas of the screen are rectangular.

3. The method according to claim 1 wherein altering sizes of the plurality of corresponding areas comprises changing lengths of at least some of the corresponding areas and changing widths of at least some of the corresponding areas.

4. The method according to claim 1 wherein the light sources comprise laser light sources.

5. The method according to claim 1 wherein delivering light from the light sources to the corresponding areas comprises relaying light to the corresponding area by way of beam shaping and beam expanding optics.

6. The method according to claim 5 comprising expanding and shaping a beam from one of the light sources to match a size and shape of the corresponding area and steering the expanded shaped beam to a location of the corresponding area.

7. The method according to claim 6 wherein steering the expanded and shaped beam comprises adjusting two-axis scanning mirror optics.

8. The method according to claim 6 wherein expanding the beam comprises expanding the beam by different amounts in each of two perpendicular directions.

9. The method according to claim 6 wherein expanding the beam comprises passing the beam through a pair of cylindrical lenses.

10. A display apparatus comprising:
- a plurality of light sources each associated with an optical path arranged to carry light from the plurality of light sources to a plurality of corresponding image areas, wherein each image area corresponds to illumination with a selected amount of light for that image area, wherein the amount of light from the plurality of light sources corresponds to a delivered amount of light based on image data describing a target light field for displaying an image;
- a dynamically addressable light re-distributor configured to receive the delivered amount of light from the plurality of light sources to redirect the light to the image area;
- a controller operatively coupled to a dynamically-addressable focusing element to alter sizes of the corresponding image areas in response to image data, wherein the controller is configured with a light distribution scheme based on the image data;
- wherein the dynamically addressable light re-distributor comprises receiving optics and the dynamically-addressable focusing element, the receiving optics being configured to receive an incoming light profile formed by the delivered amount of light from the plurality of light sources and transform the incoming light profile into an illumination light field that substantially matches a size, shape and angular acceptance range of the dynamically-addressable focusing element;
- wherein the dynamically-addressable focusing element is controlled by distribution data that corresponds to the light distribution scheme and is configured to dynamically redistribute a display of the light to the image area in a non-subtractive manner and by altering sizes of the plurality of corresponding areas that receive the selected amount of light for that area to increase the sizes of the corresponding image areas located in darker areas of the image and to decrease the size of the corresponding image areas located in lighter areas of the image, wherein the amount of light delivered from the dynamically addressable light re-distributor to the display after passing through the dynamically-addressable focusing element substantively does not change compared to the amount of light delivered to the receiving optics of the dynamically addressable light re-distributor.

11. The display apparatus according to claim 10 wherein the control circuit is configured to alter sizes of the plurality of corresponding areas by changing lengths of at least some of the corresponding areas and changing widths of at least some of the corresponding areas.

12. The display apparatus according to claim 10 wherein the light sources comprise laser light sources.

13. The display apparatus according to claim 10 wherein the optical paths comprise controllable beam shaping and beam expanding optics arranged to deliver light from the corresponding light sources to the corresponding areas.

14. The display apparatus according to claim 10, wherein the optical paths comprise two-axis scanning mirror optics.

15. The display apparatus according to claim 10 wherein each of the optical paths comprises a pair of cylindrical lenses.

* * * * *